United States Patent
Kurasawa et al.

(10) Patent No.: US 9,507,196 B2
(45) Date of Patent: Nov. 29, 2016

(54) DISPLAY DEVICE WITH INPUT DEVICE, METHOD OF MANUFACTURING THE SAME, AND ELECTRONIC APPARATUS

(71) Applicant: Japan Display Inc., Tokyo (JP)

(72) Inventors: Hayato Kurasawa, Tokyo (JP); Kohei Azumi, Tokyo (JP); Koji Ishizaki, Tokyo (JP); Hideki Kaneko, Tokyo (JP); Tsutomu Harada, Tokyo (JP)

(73) Assignee: Japan Display Inc., Tokyo (JP)

( * ) Notice: Subject to any disclaimer, the term of this patent is extended or adjusted under 35 U.S.C. 154(b) by 140 days.

(21) Appl. No.: 13/954,452

(22) Filed: Jul. 30, 2013

(65) Prior Publication Data

US 2014/0036166 A1    Feb. 6, 2014

(30) Foreign Application Priority Data

Aug. 1, 2012    (JP) .................... 2012-170807

(51) Int. Cl.
 *G06F 3/041*    (2006.01)
 *G06F 3/045*    (2006.01)
 *G02F 1/1335*    (2006.01)
 (Continued)

(52) U.S. Cl.
 CPC ...... *G02F 1/13338* (2013.01); *G02F 1/133528* (2013.01); *G02F 1/134363* (2013.01); *G06F 3/044* (2013.01); *G06F 3/0412* (2013.01); *G02F 2001/134318* (2013.01); *Y10T 29/49117* (2015.01)

(58) Field of Classification Search
 CPC ...... G06F 3/044; G06F 3/0412; G06F 3/041; G06F 3/0416
 See application file for complete search history.

(56) References Cited

U.S. PATENT DOCUMENTS 8,610,859 B2    12/2013    Kim et al.
8,786,557 B2    7/2014    Noguchi et al.
(Continued)

FOREIGN PATENT DOCUMENTS

CN    102279480    12/2011
JP    2002-342016    11/2002
(Continued)

OTHER PUBLICATIONS

Office Action issued in connection with Korean Patent Application No. 10-2013-0090951, dated Oct. 31, 2014. (3 pages).
(Continued)

*Primary Examiner* — Alexander Eisen
*Assistant Examiner* — Nan-Ying Yang
(74) *Attorney, Agent, or Firm* — K&L Gates LLP

(57) ABSTRACT

The reliability of a display device with an input device is improved. A plurality of detection electrodes (input position detection electrodes) forming an electrostatic capacity between them and a common electrode of a display device to detect an input position are formed on a different substrate from substrates configuring the display device. Moreover, a polarizing plate and the substrate on which the plurality of detection electrodes are formed are adhesively fixed via, for example, an adhesive layer so that the plurality of detection electrodes are fixed so as to be separated apart from the display device. Thus, a distance between electrodes (the detection electrode and a driving electrode) for detecting an input position can be set separately from a thickness of the display device, and therefore, reduction in detection sensitivity (detection reliability) for the input position due to increase in the electrostatic capacity can be suppressed.

13 Claims, 17 Drawing Sheets

(51) Int. Cl.
*G02F 1/1333* (2006.01)
*G02F 1/1343* (2006.01)
*G06F 3/044* (2006.01)

(56) References Cited

U.S. PATENT DOCUMENTS

| | | | |
|---|---|---|---|
| 9,442,608 B2 | 9/2016 | Ishizaki et al. | |
| 2009/0096761 A1* | 4/2009 | Cho | 345/174 |
| 2009/0322704 A1* | 12/2009 | Anno | 345/174 |
| 2010/0182273 A1 | 7/2010 | Noguchi et al. | |
| 2011/0063239 A1* | 3/2011 | Xie | G06F 3/045 345/173 |
| 2011/0199334 A1* | 8/2011 | Hwang et al. | 345/174 |
| 2011/0285640 A1* | 11/2011 | Park et al. | 345/173 |
| 2011/0299015 A1* | 12/2011 | Liu et al. | 349/96 |
| 2011/0304571 A1* | 12/2011 | Kim et al. | 345/173 |
| 2012/0105344 A1 | 5/2012 | Ko et al. | |
| 2014/0146013 A1 | 5/2014 | Noguchi et al. | |
| 2014/0292718 A1 | 10/2014 | Noguchi et al. | |

FOREIGN PATENT DOCUMENTS

| | | |
|---|---|---|
| JP | 2009-244958 | 10/2009 |
| JP | 2001-160745 | 7/2010 |
| JP | 2010277461 A * | 12/2010 |
| JP | 2012-063839 | 3/2012 |
| JP | 2012-099083 | 5/2012 |
| KR | 20100127164 | 12/2010 |

OTHER PUBLICATIONS

Japanese Office Action issued Jun. 2, 2015 in corresponding Japanese Application No. 2012-170807.
Chinese Office Action issued Jul. 28, 2015 in corresponding Chinese Application No. 2013103322178.
Taiwanese Office Action issued Oct. 13, 2015 in corresponding Taiwanese Application No. 102126163.
Japanese Office Action issued Oct. 4, 2016 in corresponding Japanese Application no. 2015-239168.

* cited by examiner

FIG. 12A

| ADHESIVE LAYER 22 | | TOTAL OF SUBSTRATE 11 TO ADHESIVE LAYER 22 | | (A2)/(A1) | DIFFERENCE FROM REFERENCE VALUE | DETECTION ACCURACY [mm] | EVALUATION |
|---|---|---|---|---|---|---|---|
| THICKNESS [μm] | RELATIVE DIELECTRIC CONSTANT/ THICKNESS (A1) | THICKNESS [μm] | RELATIVE DIELECTRIC CONSTANT/ THICKNESS (A2) | | | | |
| 50 | 0.050 | 450 | 0.010 | 19.4% | −13.1% | ±2.3 | × |
| 60 | 0.042 | 461 | 0.009 | 22.3% | −10.1% | ±2.0 | △ |
| 80 | 0.031 | 482 | 0.009 | 27.7% | −4.8% | ±0.4 | ○ |
| 100 | 0.025 | 500 | 0.008 | 32.4% | 0.0% | ±0.2 | ○ |
| 120 | 0.021 | 520 | 0.008 | 36.5% | 4.1% | ±0.4 | ○ |
| 150 | 0.017 | 550 | 0.007 | 41.9% | 9.4% | ±1.8 | ○ |
| 160 | 0.016 | 560 | 0.007 | 43.4% | 11.0% | ±2.0 | △ |
| 170 | 0.015 | 570 | 0.007 | 44.9% | 12.5% | ±2.3 | × |

FIG. 12B

| ADHESIVE LAYER 22 | | TOTAL OF SUBSTRATE 11 TO ADHESIVE LAYER 22 | | (A2)/(A1) | DIFFERENCE FROM REFERENCE VALUE | DETECTION ACCURACY [mm] | EVALUATION |
|---|---|---|---|---|---|---|---|
| THICKNESS [μm] | RELATIVE DIELECTRIC CONSTANT/ THICKNESS (A1) | THICKNESS [μm] | RELATIVE DIELECTRIC CONSTANT/ THICKNESS (A2) | | | | |
| 200 | 0.013 | 950 | 0.004 | 34.8% | −22.4% | ±3.5 | × |
| 300 | 0.008 | 1050 | 0.004 | 44.4% | −12.7% | ±2.2 | △ |
| 400 | 0.006 | 1150 | 0.003 | 51.6% | −5.5% | ±0.4 | ○ |
| 500 | 0.005 | 1250 | 0.003 | 57.1% | 0.0% | ±0.1 | ○ |
| 600 | 0.004 | 1350 | 0.003 | 61.5% | 4.4% | ±0.4 | ○ |
| 700 | 0.004 | 1450 | 0.002 | 65.1% | 8.0% | ±0.5 | ○ |
| 800 | 0.003 | 1550 | 0.002 | 68.1% | 10.9% | ±2.1 | △ |
| 900 | 0.003 | 1650 | 0.002 | 70.6% | 13.4% | ±2.6 | × |

| REFRACTIVE INDEX: R1 (ADHESIVE LAYER) | REFRACTIVE INDEX: R2 (SPACER) | (R1-R2)/(R1+R2) | VISIBILITY EVALUATION | |
|---|---|---|---|---|
| | | | 200 μm | 500 μm |
| 1.48 | 1.38 | 3.5% | × | × |
| | 1.41 | 2.4% | ○ | × |
| | 1.48 | 0.0% | ○ | ○ |
| | 1.52 | -1.3% | ○ | ○ |
| | 1.56 | -2.6% | ○ | × |
| | 1.58 | -3.3% | ○ | × |
| | 1.61 | -4.2% | × | × |
| 1.52 | 1.41 | 3.8% | × | × |
| | 1.48 | 1.3% | ○ | ○ |
| | 1.52 | 0.0% | ○ | ○ |
| | 1.56 | -1.3% | ○ | ○ |
| | 1.58 | -1.9% | ○ | ○ |
| | 1.61 | -2.9% | ○ | × |
| | 1.63 | -3.5% | × | × |
| 1.58 | 1.48 | 3.3% | × | × |
| | 1.52 | 1.9% | ○ | ○ |
| | 1.56 | 0.6% | ○ | ○ |
| | 1.58 | 0.0% | ○ | ○ |
| | 1.61 | -0.9% | ○ | ○ |
| | 1.63 | -1.6% | ○ | ○ |
| | 1.67 | -2.8% | ○ | × |
| | 1.70 | -3.7% | × | × |

DISPLAY DEVICE WITH INPUT DEVICE, METHOD OF MANUFACTURING THE SAME, AND ELECTRONIC APPARATUS

CROSS REFERENCES TO RELATED APPLICATIONS

The present application claims priority to Japanese Priority Patent Application JP 2012-170807 filed in the Japan Patent Office on Aug. 1, 2012, the entire content of which is hereby incorporated by reference.

BACKGROUND

The present invention relates to a display device with an input device and a method of manufacturing the same. More particularly, the present invention relates to a display device with an input device of an electrostatic capacitive type and a method of manufacturing the same.

In recent years, a technique has been proposed in which an input device referred to as a touch panel (touch sensor) is attached to a display surface side of a display device so as to detect and output contact position data thereon when a finger or others is in contact with the touch panel. Moreover, another technique has also been proposed in which a part of an electrode for detecting the contact position on the touch panel and a part of a display electrode of the display device are shared to be used in order to make a display device with a touch panel thinner (for example, Japanese Patent Application Laid-Open Publication No. 2009-244958 (Patent Document 1)).

SUMMARY

However, according to the study by the inventors of the present application, it is found that the display device with the input device has the following problems.

For example, in the case that a part of the electrode for detecting the contact position on the touch panel and a part of the display electrode for the display device are shared to be used, a configuration in which the electrode for the input device is formed on a substrate on a display surface side of the display device is considered. However, in this case, when the electrode for the input device is formed, the substrate and a display functional layer (for example, liquid crystal layer) in the display device are integrally formed, and therefore, a heating process at a high temperature cannot be applied thereto in a process for forming the electrode for the input device. Since a high visible light transparency is required for an electrode to be formed on the display surface side of the display device, an electrode material referred to as a so-called transparent electrode is used. When this transparent electrode is formed in a low-temperature process, increase in a resistance value and reduction in a visible light transmittance are caused.

Moreover, for example, in a case that an electrode for detecting an input position of an electrostatic capacitive type is formed on a substrate of the display device, the electrostatic capacity is varied depending on a thickness of the display device. Therefore, by making the display device thinner, a distance between the electrodes for detecting the input positions is shorter. In this case, the electrostatic capacity between the electrodes is higher, and therefore, reduction in detection sensitivity of the input position is caused.

Further, in the display device with the input device, a circuit for controlling the input device and a circuit for controlling the display device are required, and therefore, a wiring substrate on which the circuit for the input device is formed and a wiring substrate on which the circuit for the display device is formed are embedded therein, and a configuration of the device as a whole is complicated.

The present invention has been made in consideration of the above-described problems, and a preferred aim thereof is to provide a technique for improving reliability of a display device with an input device.

Also, another preferred aim thereof is to provide a technique for simplifying a structure of a wiring substrate to be connected to the display device with the input device.

In a display device with an input device according to the present invention, a plurality of input position detection electrodes which form an electrostatic capacity in a space with a common electrode of the display device so as to detect an input position are formed on a surface of a different substrate from a substrate forming the display device, the surface facing the display device. Moreover, the plurality of input position detection electrodes are fixed so as to be separated apart from the display device.

Moreover, in another display device with an input device according to the present invention, an input position detection circuit to be electrically connected to a plurality of input position detection electrodes formed on a different substrate from a substrate forming the display device is electrically connected to a connection terminal formed on the substrate forming the display device via a conductive member.

According to the above-described display device with the input device according to the present invention, the plurality of input position detection electrodes can be manufactured separately from the display device, and therefore, reduction in the reliability due to the increase in the resistance value or the reduction in the visible light transmittance can be suppressed. Moreover, since the plurality of input position detection electrodes are fixed so as to be separated apart from the display device, the distance between the electrodes for detecting the input position can be set separately from the thickness of the display device, and the reduction in detection sensitivity (detection reliability) of the input position due to the increase in electrostatic capacity can be suppressed. Moreover, since the plurality of input position detection electrodes are formed on a surface of the different substrate which faces the display device, the plurality of input position detection electrodes can be protected.

Further, according to the above-described another display device with the input device according to the present invention, since the circuit for the input device and the circuit for the display device can be formed on a common wiring substrate, the structure of the wiring substrate connected to the display device with the input device can be simplified.

Additional features and advantages are described herein, and will be apparent from the following Detailed Description and the figures.

BRIEF DESCRIPTION OF THE FIGURES

FIGS. 12A and 12B are explanatory diagrams illustrating results evaluated by the inventors of the present application on a thickness of an adhesive layer for adhesively fixing the touch detection base member and the display device to each other in the display device with the input device illustrated in FIG. 6;

DETAILED DESCRIPTION

Hereinafter, embodiments of the present invention will be described in detail based on the accompanying drawings. The components having the same or similar function are denoted by the same or similar reference symbols throughout all drawings for describing the following embodiments, and the repetitive description thereof will be omitted in principle. Also, in the following embodiments, explanations of an example of the display device will be made by exemplifying a liquid crystal display device using a liquid crystal layer as a display functional layer forming a display image by applying a display voltage between display electrodes.

Note that FIGS. 5, 6, 7, 9, 10, 11, 16, 21 and 22 explained in the following embodiments are cross-sectional diagrams. However, in order to easily see, hatching is omitted therein in principle. Moreover, in each cross-sectional diagram, liquid crystals LC forming a liquid crystal layer 16 are schematically illustrated by elliptical shapes. Further, in the above-described each cross-sectional diagram, a plurality of the same members are provided in some cases. However, in order to easily see, one of the plurality of members is denoted by a reference symbol, and the common hatching is added to the same members to be identified.

First Embodiment

<Operating Principle of Input Device of Electrostatic Capacitive Type>

Figure 1:
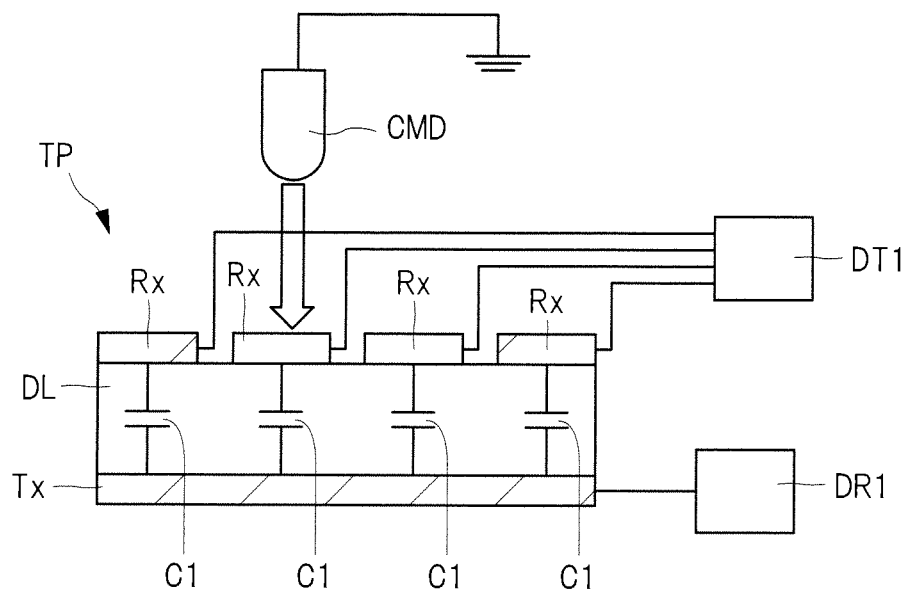
FIG. 1 is an explanatory diagram illustrating an outline configuration of a touch panel (input device) of an electrostatic capacitive type.
Figure 2:
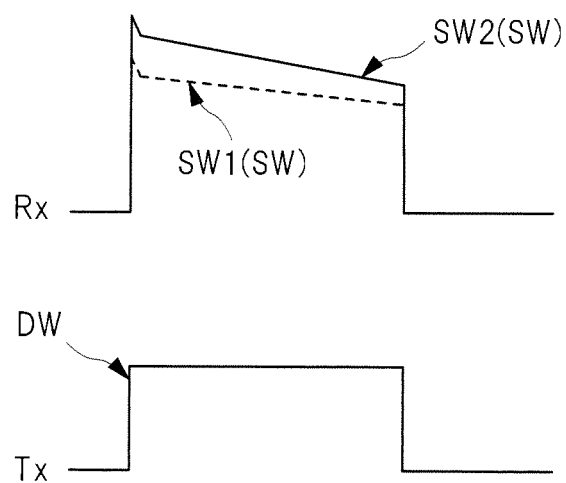
FIG. 2 is an explanatory diagram illustrating an example of a relation between a driving waveform applied to the touch panel illustrated in FIG. 1 and a signal waveform outputted from the touch panel.
Figure 3:
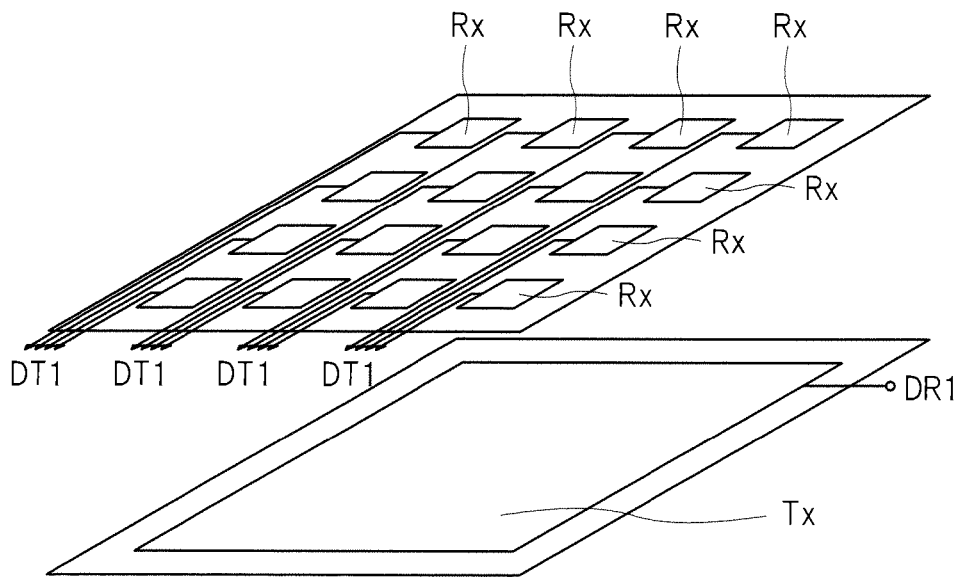
FIG. 3 is an explanatory diagram schematically illustrating an example of an arrangement of driving electrodes and detection electrodes illustrated in FIG. 1.
Figure 4:
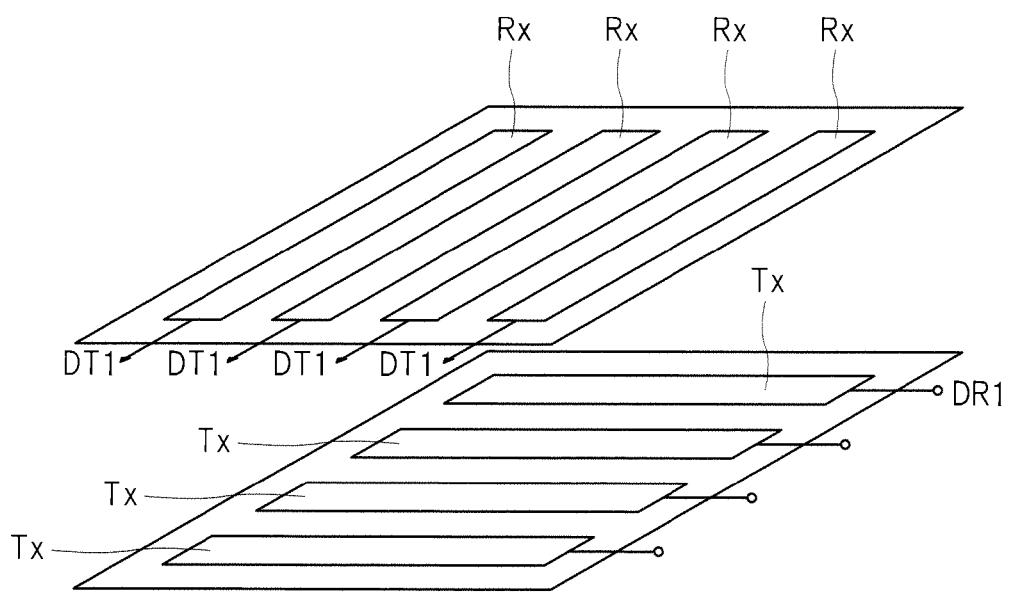
FIG. 4 is an explanatory diagram illustrating a modification example of FIG. 3.

First, a basic operating principle of an input device referred to as a touch panel (or a touch sensor) of an electrostatic capacitive type. FIG. 1 is an explanatory diagram illustrating an outline configuration of the touch panel (or input device) of the electrostatic capacitive type. Moreover, FIG. 2 is an explanatory diagram illustrating an example of a relation between a driving waveform applied to the touch panel illustrated in FIG. 1 and a signal waveform outputted from the touch panel. Further, FIG. 3 is an explanatory diagram schematically illustrating an example of an arrangement of a driving electrode and a detection electrode illustrated in FIG. 1, and FIG. 4 is an explanatory diagram illustrating a modification example of FIG. 3.

A touch panel, or an input device, TP of an electrostatic capacitive type is provided with a dielectric layer DL and a plurality of capacitive elements C1 formed of paired electrodes that are arranged to face each other through the dielectric layer DL. To a driving electrode Tx forming one of the paired electrodes, a driving waveform DW which is, for example, a rectangular wave illustrated in FIG. 2 is applied from a driving circuit DR1 for the input device. On the other hand, from a detection electrode, or an input position detection electrode, Rx forming the other of the paired electrodes, an electric current in accordance with, for example, the driving waveform DW illustrated in FIG. 2 and a capacitance of the capacitive elements C1 illustrated in FIG. 1 is carried so as to output a signal waveform SW. The signal waveform SW outputted from the detection electrodes Rx is outputted to a detection circuit DT1 (see FIG. 1) for detecting an input position.

Here, as illustrated in FIG. 1, when an input tool CMD such as a finger or a touch pen serving as a capacitive element whose one end is connected to a ground potential is approached to the detection electrode Rx of the touch panel TP or is in contact therewith, a capacitance of the input tool CMD is added to the capacitive element C1 at a position close to the input tool CMD. Accordingly, a signal waveform SW1 outputted from the detection electrode Rx arranged at a position close to the input tool CMD is smaller than a signal waveform SW2 outputted from another detection electrode Rx arranged at a different position (for example, see FIG. 2). Therefore, the detection circuit DT1 can monitor each signal waveform SW transmitted from the plurality of detection electrodes Rx, and specify the position of the input tool CMD based on an amount of change in the signal waveform SW. For example, a threshold value is previously set to the amount of change of the signal waveform SW, so that the position of the input tool CMD can be outputted in reference to positional data of the detection electrode Rx having a value exceeding the threshold value. Moreover, for example, the value of the signal waveform SW can be also directly compared with the threshold value.

Note that the phenomenon in which the capacitance of the input tool CMD is added to the capacitive element C1 is seen not only when the input tool CMD and the detection electrode Rx are in contact with each other but also when the input tool CMD and the detection electrode Rx are approached to each other. Therefore, it is not required to expose the detection electrode Rx to a surface on which the input tool CMD is arranged. For example, a cover member can be arranged between the detection electrode Rx and the input tool CMD so that the detection electrode Rx is protected.

Also, as a method of monitoring the amount of change in the signal waveform SW, there are various modification examples. For example, a method of measuring a voltage value generated in the detection electrode Rx or a method of measuring an accumulated amount of a current value per unit time flowing through the detection circuit DT1 can be used.

Moreover, various modes can be also applied to a planar layout of each of the driving electrodes Tx and the detection electrodes Rx. For example, as illustrated in FIG. 3, the driving electrode Tx can be arranged as a solid pattern, and the detection electrode Rx can be arranged as a column/row pattern (or a matrix pattern). Alternatively, as illustrated in FIG. 4, the driving electrode Tx and the detection electrode Rx can be arranged as strips so as to intersect with each other (preferably, so as to be orthogonal to each other). In this case, a driving waveform DW (see FIG. 2) is sequentially applied to the plurality of driving electrodes Tx, and an amount of change in the signal waveform SW (see FIG. 2) is determined for each of the intersections between the driving electrodes Tx and the detection electrodes Rx in a plan view. Moreover, although illustration is omitted, the mode illustrated in FIG. 3 and the mode illustrated in FIG. 4 can be combined with each other to be applied.

<Basic Configuration of Display Device>

Figure 5:
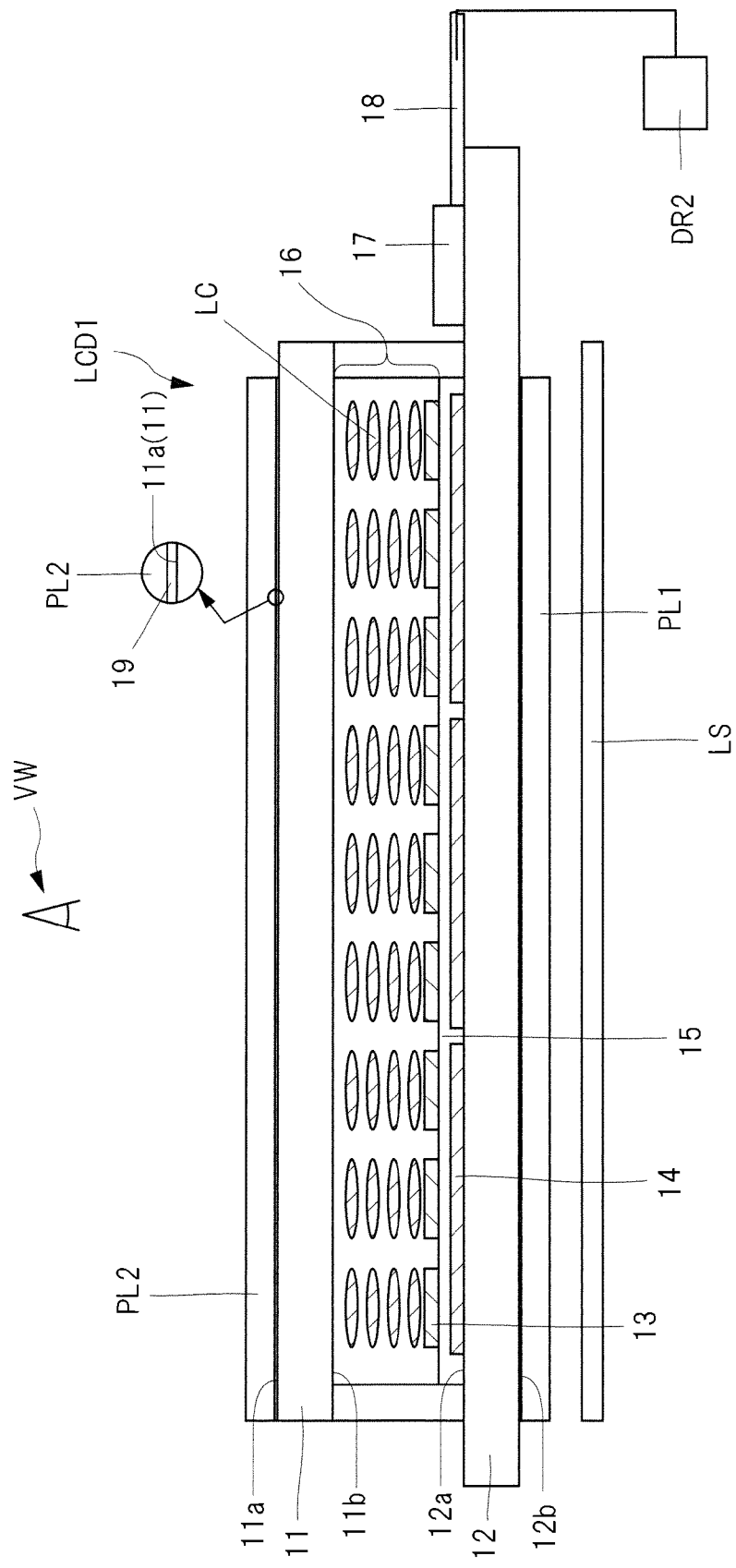
FIG. 5 is a cross-sectional diagram of a principal part illustrating a basic configuration of an example of a liquid crystal display device.

Next, a basic configuration of the display device will be explained. FIG. 5 is a cross-sectional diagram of a principal part illustrating a basic configuration of one example of a liquid crystal display device.

The liquid crystal display device is roughly categorized into the following two depending on an applying direction of electric field for changing orientations of liquid crystal molecules of a liquid crystal layer serving as a display functional layer. That is, the first category is exemplified as a so-called vertical electric field mode in which the electric field is applied in a thickness direction (or in an out-of-plane direction) of the liquid crystal display device. The vertical electric field mode is exemplified as, for example, a TN (Twisted Nematic) mode, a VA (Vertical Alignment) mode, and others. Also, the second category is exemplified as a so-called horizontal electric field mode in which the electric field is applied in a planar direction (or in an in-plane direction) of the liquid crystal display device. The horizontal electric field mode is exemplified as, for example, an IPS (In-Plane Switching) mode, an FFS (Fringe Field Switching) mode, and others. A technique to be explained below can be applied to both of the vertical electric field mode and the horizontal electric field mode. However, as one example, FIG. 5 illustrates a display device of the horizontal electric field mode (more specifically, the FFS mode).

A display device LCD1 illustrated in FIG. 5 is provided with: a substrate 11 having a front surface (or a surface) 11a arranged on a display surface side (or a viewer VW side); and a substrate 12 arranged on an opposite side to the front surface 11a of the substrate 11 so as to be separated apart from the substrate 11. Moreover, the display device LCD1 is provided with: a plurality of pixel electrodes 13 arranged between the substrate 11 and the substrate 12; and a common electrode 14 arranged between the substrate 11 and the substrate 12. Further, the display device LCD1 is further provided with a liquid crystal layer 16 which is arranged between the substrate 11 and the substrate 12 and which is a display functional layer forming a display image by applying a displaying voltage between the plurality of pixel electrodes 13 and the common electrode 14.

The substrate 11 is a color filter substrate on which a color filter (whose illustration is omitted) for forming a color displayed image is formed, and is provided with: a front surface 11a to be the display surface side; and a back surface (or a surface, rear surface, or inner surface) 11b positioned on an opposite side to the front surface 11a. The substrate 11 is formed by pasting a color filter onto one surface of a base member such as a glass substrate, the color filter being formed by periodically arranging color filter layers with three colors of red (R), green (G), and blue (B). In the color display device, one pixel (or one picture element) is formed by, for example, grouping sub-pixels of the three colors of red (R), green (G), and blue (B) as one set.

Moreover, the substrate (or array substrate) 12 is a circuit substrate on which an image displaying circuit is mainly formed, and is provided with: a front surface (or a surface or inner surface) 12a positioned on the substrate 11 side; and a back surface (or a surface or rear surface) 12b positioned on an opposite side thereto. On the front surface 12a side of the substrate 12, an active element such as a TFT (Thin-Film Transistor) and a plurality of pixel electrodes 13 are formed in a matrix pattern (or an array pattern). Moreover, in the example illustrated in FIG. 5, the display device LCD1 in the horizontal electric field mode (more specifically, the FFS mode) as described above is illustrated, and therefore, the common electrode 14 is also formed on the front surface 12a side of the substrate 12. The common electrode 14 is formed on the front surface 12a of the substrate 12, and an insulating layer 15 is stacked on the common electrode 14. Moreover, the plurality of pixel electrodes 13 are formed on the insulating layer 15 so as to face the common electrode 14 via the insulating layer 15. In the display device LCD1, during a display period, a pixel voltage is applied to the pixel electrode 13, and a common driving signal is applied to the common electrode 14, so that a display voltage of each pixel is defined.

Also, on the substrate 12, a display driver for driving the pixel electrodes 13 and wires such as a source line for supplying the pixel signal to the pixel electrode 13 and a gate line for driving the TFT are formed in addition to the above-described members although illustrations are omitted.

Moreover, between the substrate 11 and the substrate 12, a liquid crystal layer 16 which is the display functional layer for forming the display image by applying the displaying voltage between the pixel electrode 13 and the common electrode 14 is provided. The liquid crystal layer 16 converts light passing therethrough in accordance with a state of the applied electric field, and, for example, liquid crystals LC corresponding to various types of modes such as TN, VA, and FFS are used. Note that an orientation film is formed between the liquid crystal layer 16 and each of the substrates 11 and 12 although illustrations are omitted.

Moreover, on the back surface 12b side of the substrate 12 of the display device LCD1, a light source LS and a polarizing plate PL1 for filtering light generated from the light source LS are provided. On the other hand, on the front surface 11a side of the substrate 11, a polarizing plate PL2 for filtering light passing through the substrate 11 is provided.

Moreover, in the example illustrated in FIG. 5, onto the front surface 12a of the substrate 12, a semiconductor chip (or a driver chip) 17 having a driving circuit for supplying a driving potential to the pixel electrode 13 and a wiring substrate 18 electrically connected to a driving circuit DR2 for the image display are electrically connected to each other. The wiring substrate 18 is, for example, a so-called flexible wiring board in which a plurality of wires are formed inside a resin film and which can be freely deformed in accordance with a shape of a layout position. Wires formed in the wiring substrate 18 include a wire 18a electrically connected to the pixel electrode 13 and a wire 18b electrically connected to the common electrode 14. Note that, as the example illustrated in FIG. 5, an aspect of a so-called COG (Chip on glass) mode in which a semiconductor chip is mounted on the substrate 12 is exemplified. However, a place on which the semiconductor chip is mounted is not limited to a place on the substrate 12, and, for example, another mode in which it is mounted on the wiring substrate 18 can be applied.

A method of displaying color images by the use of the display device LCD1 illustrated in FIG. 5 is, for example, as follows. That is, light emitted from the light source LS is filtered by the polarizing plate PL1, and light (or polarized light) having an amplitude that is allowed to pass through the polarizing plate PL1 enters the liquid crystal layer 16. The incident light into the liquid crystal layer 16 is propagated in a thickness direction of the liquid crystal layer 16 (or a direction from the substrate 12 toward the substrate 11) with its polarized state being changed in accordance with a refractive index anisotropy (or birefringence) of the liquid crystal LC, and is emitted from the substrate 11. At this time, the liquid crystal orientation is controlled by the electric field formed by applying a voltage to the pixel electrode 13 and the common electrode 14 so that the liquid crystal layer 16 is functioned as an optical shutter. That is, in the liquid crystal layer 16, optical transmittance can be controlled for each of the sub-pixels. The light having reached the substrate 11 is subjected to a color filtering process (or a process for absorbing light having wavelengths except for a predetermined wavelength) in the color filter formed in the substrate 11, and is emitted from the front surface 11a. Moreover, the light released from the front surface 11a is filtered by the polarizing plate PL2, and reaches the viewer VW.

<Configuration of Display Device with Input Device>

Figure 6:
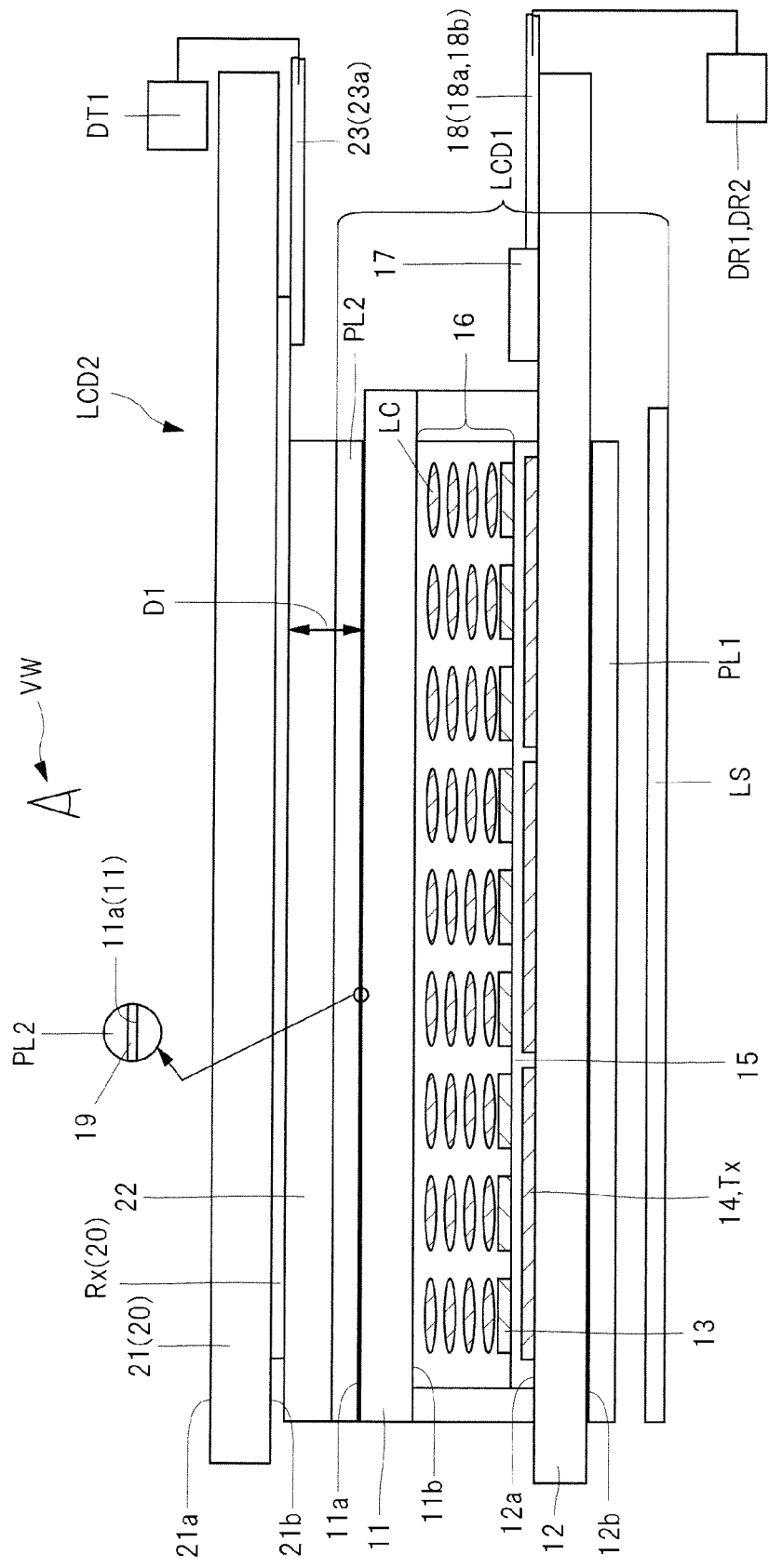
FIG. 6 is a cross-sectional diagram of a principal part illustrating a basic configuration of an example of a display device with an input device.
Figure 7:
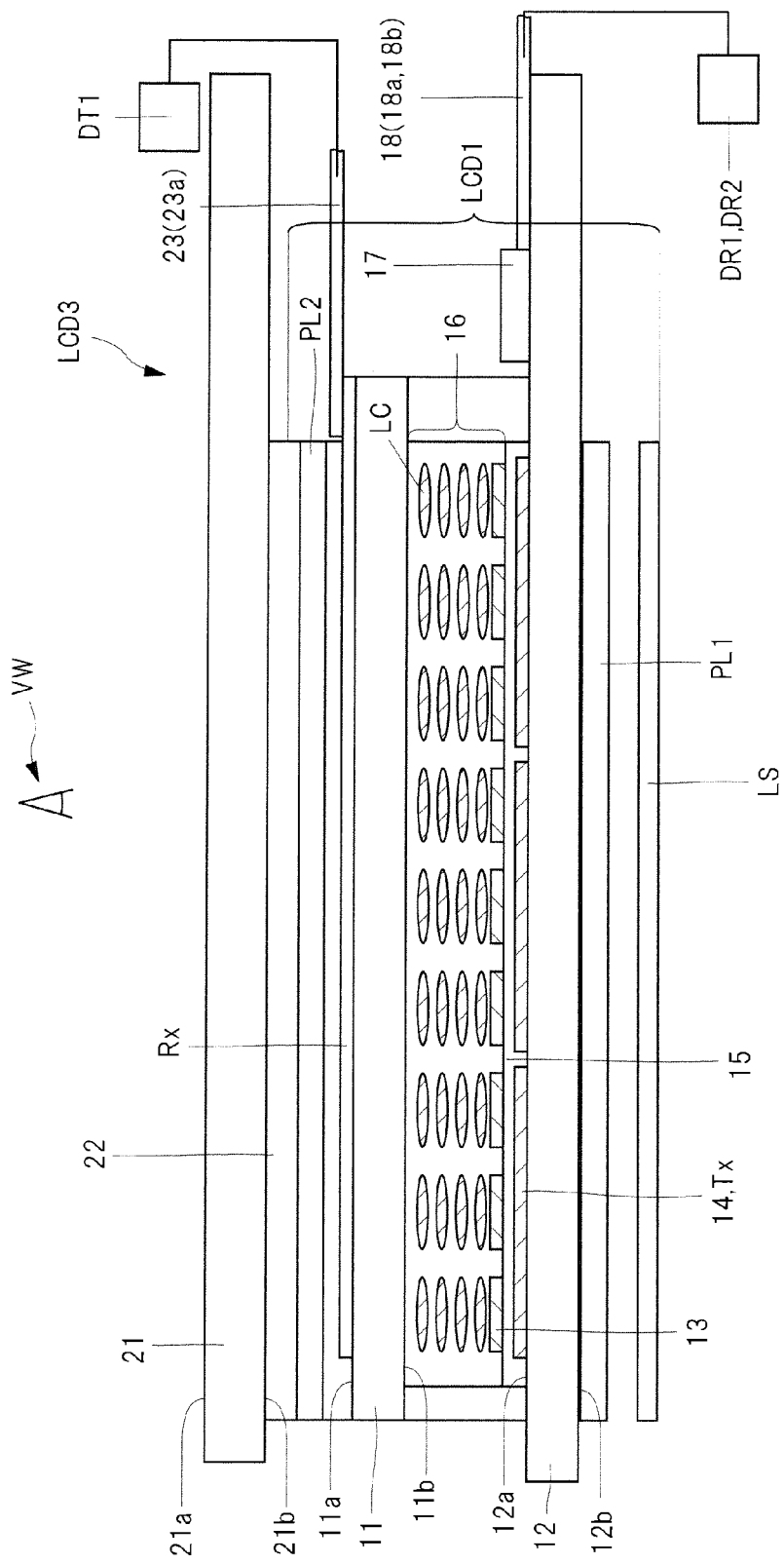
FIG. 7 is a cross-sectional diagram of a principal part illustrating an example of another display device with an input device of FIG. 6.
Figure 8:
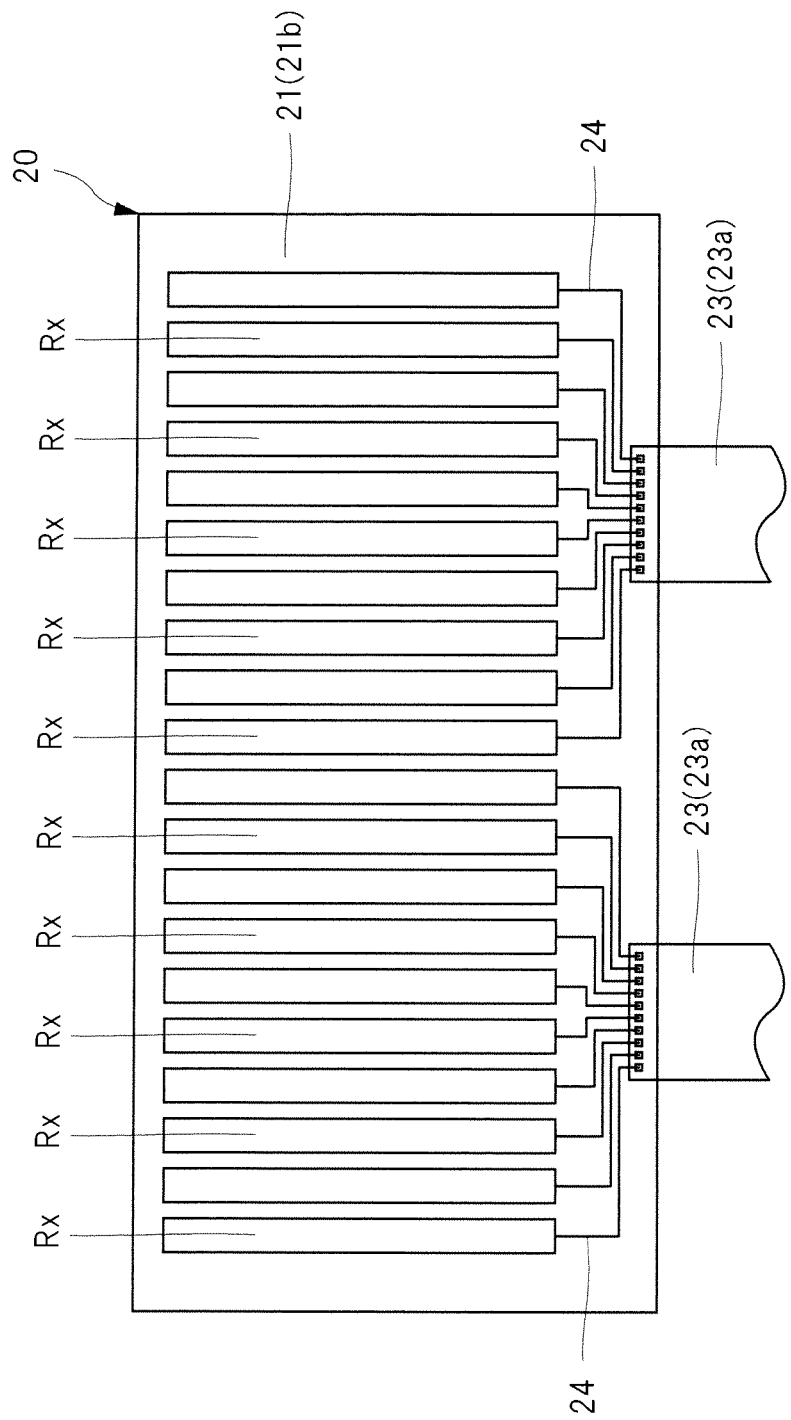
FIG. 8 is a plan diagram schematically illustrating an example of a layout of a conductor pattern formed on a touch detection base member 20 illustrated in FIG. 6.

Next, a configuration of a display device with an input device obtained by combining a function of the above-described input device with a function of a display device will be explained. FIG. 6 is a cross-sectional diagram of a principal part illustrating a basic configuration of an example of a display device with an input device. Also, FIG. 7 is a cross-sectional diagram of a principal part illustrating an example of another display device with an input device of FIG. 6. Further, FIG. 8 is a plan diagram schematically illustrating an example of a layout of a conductor pattern formed on a touch detection base member 20 illustrated in FIG. 6.

To a display device LCD2 with an input device illustrated in FIG. 6 on the substrate 11 side of the display device LCD1 explained with reference to FIG. 5, a touch detection base member 20 formed of a substrate 21 onto which a detection electrode (or an input position detection electrode) Rx is attached is attached.

The substrate 21 is provided with: a front surface (or a surface) 21a arranged on a display surface side (or a viewer VW side); and a back surface (or a surface or rear surface) 21b positioned on an opposite side to the front surface 21a, and the plurality of detection electrodes Rx explained with reference to FIG. 1 are formed in the back surface 21b. A wiring substrate 23 is connected to the detection electrodes Rx, and is electrically connected via the wiring substrate 23 to the detection circuit DT1 for detecting the input position. The wiring substrate 23 is, for example, a so-called flexible wiring board in which a plurality of wires are formed inside a resin film and which can be freely deformed in accordance with a shape of a layout position. Wires formed in the wiring substrate 23 include a wire 23a which is electrically connected to the plurality of detection electrodes Rx and which transmits a detection signal to the detection circuit DT1.

Moreover, in the touch detection base member 20, the driving electrode Tx as explained with reference to FIG. 1 is not formed. In the display device LCD2 with the input device, as illustrated in FIG. 6, the driving waveform DW for detecting the input position explained with reference to FIG. 2 is applied to the common electrode 14 of the display device LCD1. To the common electrode 14, the driving waveform DW (see FIG. 2) can be applied via, for example, the wiring substrate 18 illustrated in FIG. 6. The common electrode 14 is electrically connected to the driving circuit DR1 via the wiring substrate 18.

In a different expression of such a configuration as applying the driving waveform DW for detecting the input position to the common electrode 14 as described above, the common electrode 14 in the display device LCD2 with the input device is designed as an electrode in combination of a function serving as the common electrode 14 for the display device LCD1 and a function serving as the driving electrode Tx for the input device. As method of combining the common electrode 14 and the driving electrode Tx for use, the method can be achieved by, for example, dividing a certain period (or one period) into a touch detection period (or an input period) and a display writing period. In this manner, by combining the common electrode 14 for the display device LCD1 and the driving electrode Tx for the input device, a total thickness of the display device LCD2 with the input device can be reduced.

Here, when the common electrode 14 and the driving electrode Tx are combined with each other for use, such as aspect that the detection electrode Rx is directly formed on the front surface 11a of the substrate 11 as a display device LCD3 with an input device illustrated in FIG. 7 is considered. In other words, in the display device LCD3 with the input device illustrated in FIG. 7, the detection electrode Rx is formed between the polarizing plate PL2 on the display surface side and the substrate 11 with the color filter formed thereon. Further, in other words, in the display device LCD3 with the input device, the detection electrode Rx and the driving electrode Tx serving as the input device are formed between the polarizing plates PL1 and PL2 that are arranged so as to face each other, that is, inside the display device LCD1. By forming the detection electrodes Rx and the driving electrode Tx serving as the input device inside the display device as described above, the thickness of the display device with the input device can be the thinnest.

However, according to the study by the inventors of the present application, the following problems have found when the detection electrode Rx is formed on the substrate 11 forming the display device LCD1 such as the display device LCD3 with the input device illustrated in FIG. 7. That is, when the detection electrode Rx is formed on the substrate 11, the detection electrode Rx is formed thereon in a state that the liquid crystal layer 16 is formed between the substrate 11 and the substrate 12. Therefore, in a process for forming the detection electrode Rx, application of such a high temperature as exceeding 100° C. causes deterioration of the liquid crystals LC. On the other hand, since the detection electrode Rx is an electrode formed closer to the display surface side than the liquid crystal layer 16 serving as the display functional layer, this is made of an electrode material referred to as a transparent electrode material. As the transparent electrode material, for example, ITO (Indium-tin-oxide), zinc oxide, and others can be exemplified. In these transparent electrode materials, by applying a temperature of, for example, 200° C. or higher upon forming an electrode, a resistance value can be reduced, or the visible light transmittance can be improved. That is, if the applied temperature is low (for example, about 25° C. to 100° C.) upon forming the detection electrode Rx, there are problems that the resistance value of the detection electrodes Rx is increased or the visible light transmittance is lowered.

Moreover, in the case of the input device of the electrostatic capacitive type in which the driving electrode Tx and the detection electrode Rx are arranged so as to face each other via the dielectric layer DL as illustrated in the above-described FIG. 1, when the electrostatic capacity between the electrodes increases, a shape sharpness of the signal waveform SW illustrated in FIG. 2 is moderated (or changing quantity thereof is reduced). That is, when the thickness of the dielectric layer DL arranged between the driving electrode Tx and the detection electrodes Rx that are arranged so as to face each other is thinner, the electrostatic capacity of the capacitive element C1 increases, and the detection sensitivity of the input position is reduced. When this fact is applied to the display device LCD3 with the input device illustrated in FIG. 7, the electrostatic capacity between the detection electrode Rx and the driving electrode Tx is defined mainly by the thickness of the substrate 11 and the distance between the electrodes facing each other in the display device LCD3 with the input device. Therefore, the electrostatic capacity between the driving electrode Tx and the detection electrode Rx that are arranged so as to face each other is increased due to the thinning of the substrate 11, and this causes the reduction in the detection sensitivity of the input position.

Moreover, when the distance between the polarizing plate PL2 and the detection electrodes Rx is shorter, there is a concern of corrosion of the detection electrode Rx due to influence of acid or others generated from the polarizing plate PL2. Therefore, from a viewpoint of suppressing the reduction in the detection reliability of the input position due to the corrosion of the detection electrode Rx, it is preferred to provide a barrier layer for preventing or suppressing transportation of the acid generated from the polarizing plate PL2 between the polarizing plate PL2 and the detection electrode Rx.

Moreover, when electrodes are formed on the substrate 11 serving as the color filter substrate of the display device LCD1, a risk of damaging the substrate 11 is increased in the electrode forming process. The partial damage of the color filter causes a display defect, and therefore, it is preferred that the electrodes are not directly formed on the substrate 11 from a viewpoint of improving the display reliability.

Further, when the detection electrode Rx is formed between the polarizing plate PL2 and the substrate 11, a manufacturing process for the input device is added in a manufacturing process for the display device LCD1, the number of the manufacturing processes for the display device LCD1 increases. Therefore, from a viewpoint of improving a manufacturing efficiency of the display device LCD1, it is preferred to form the detection electrode Rx separately from the display device LCD1.

Accordingly, in the display device LCD2 with the input device illustrated in FIG. 6, the detection electrode Rx for detecting the input position is formed on a substrate 21 different from that of the display device LCD1, and is fixed thereto so as to be separated apart from the front surface 11a of the substrate 11. In the example illustrated in FIG. 6, a covering member for covering the display device LCD1 is utilized as the substrate 21 on which the detection electrode Rx is formed. By forming the detection electrodes Rx on the substrate 21 serving as the covering member for covering the display device LCD1, increase in the number of the component members for the display device LCD2 with the input device can be suppressed. Moreover, by forming the detection electrode Rx on the substrate 21 serving as the covering member for covering the display device LCD1, the total thickness of the display device LCD2 with the input device can be thinned.

As illustrated in the display device LCD2 with the input device, by forming the detection electrode Rx on the substrate 21 different from that of the display device LCD1 to provide the touch detection base member 20 separately from the display device LCD1, the display device LCD1 and the touch detection base member 20 are independently manufactured from each other, and then, can be built up later. As a result, when the detection electrode Rx is formed, such a high temperature as 200° C. or higher can be applied. That is, the resistance value of the detection electrode Rx can be reduced, and the detection reliability of the input position can be improved. Moreover, the visible light transmittance of the detection electrode Rx can be improved, and the display reliability can be improved.

Moreover, in the display device LCD2 with the input device, by providing the touch detection base member 20 separately from the display device LCD1, the risk of causing the damage to the substrate 11 serving as the color filter substrate of the display device LCD1 can be reduced. Further, in the display device LCD2 with the input device, by providing the touch detection base member 20 separately from the display device LCD1, the manufacturing efficiency of the display device LCD1 can be improved.

Moreover, in the display device LCD2 with the input device, the touch detection base member 20 is provided separately from the display device LCD1, and the detection electrode Rx of the touch detection base member 20 is fixed so as to be separated apart from the front surface 11a of the substrate 11. Therefore, a value of the electrostatic capacity between the detection electrode Rx and the driving electrode Tx can be adjusted by the distance (or separated distance) between the detection electrode Rx and the substrate 11. Therefore, for example, even when the substrate 11 is thinned, the increase in the electrostatic capacity can be suppressed by increasing the distance D1.

Moreover, an adhesive layer 22 illustrated in FIG. 6 is thicker than an adhesive layer 19 for adhesively fixing the polarizing plate PL2, so that the distance D1 is adjusted by the thickness of the adhesive layer 22. When the adhesive layer 19 is thickened in order to adjust the value of the electrostatic capacity, the distance between the polarizing plate PL2 and the substrate 11 serving as the color filter substrate is farther, and therefore, influence on the displayed image is large. In the example illustrated in FIG. 6, the distance D1 is adjusted by the thickness of the adhesive layer 22, and therefore, the thickness of the adhesive layer 19 can be maintained as small as possible.

As an aspect for securing the distance D1 between the detection electrode Rx and the substrate 11, various modification examples are cited in addition to the example illustrated in FIG. 6. For example, there is a method in which the substrate 21 is adhesively fixed to a frame-shaped spacer member arranged on a peripheral edge portion of the substrate 11 although not illustrated. In this case, the distance D1 between the detection electrode Rx and the substrate 11 is defined by a height of the spacer member, so that a hollow space (such as an air layer) is arranged between the detection electrode Rx and the substrate 11.

However, in this case, the substrate 11 is coupled via the spacer member to the substrate 21 serving as the covering member, and therefore, it is easy to transmit external force applied to the substrate 21 such as impact to the substrate 11 via the spacer member. Therefore, from a viewpoint of making the impact applied to the substrate 21 difficult to transmit to the substrate 11, it is preferred to arrange the adhesive layer 22 between the substrate 11 (or the polarizing plate PL2) and the substrate 21 (or the detection electrode Rx) and adhesively fix the substrate 21 thereto via the adhesive layer 22 as illustrated in FIG. 6. The adhesive layer 22 is made of, for example, a resin material having a lower elasticity than those of the substrate 21 and the substrate 11. Moreover, the substrate 21 is fixed to the polarizing plate PL2 (or the substrate 11) by adhesive force of the adhesive layer 22, and therefore, no additional member such as a spacer member for fixing the substrate 11 and the substrate 21 is provided on the periphery of the adhesive layer. Therefore, for example, even when the external force is applied to the substrate 21, the external force can be relaxed by the adhesive layer 22 so as to be difficult to transmit to the substrate 11.

Moreover, as illustrated in FIG. 6, by arranging the adhesive layer 22 between the polarizing plate PL2 and the detection electrode Rx and increasing the thickness of the adhesive layer 22, the possibility of the corrosion of the detection electrode Rx due to the influence of the acid or others generated from the polarizing plate PL2 can be reduced. The adhesive layer 22 illustrated in FIG. 6 is thicker than the adhesive layer 19 for adhesively fixing the polarizing plate PL2, and has a thickness of, for example, 100 μm or thicker. By setting the distance between the polarizing plate PL2 and the detection electrode Rx to 100 μm or thicker, the phenomenon of the corrosion of the detection electrode Rx can be effectively prevented. Note that an explanation will be made in detail later for a preferable range of the thickness of the adhesive layer 22 to be set from a viewpoint of improving the detection accuracy of the display device LCD3 with the input device.

Moreover, in the display device LCD2 with the input device, by providing the touch detection base member 20 separately from the display device LCD1, a metal wire can be formed on the substrate 21. When a planar dimension of a display region of the display device with the input device is large, a size of the wiring substrate 23 can be reduced by, for example, forming a leader wire 24 on the substrate 21 on which the detection electrode Rx is formed and electrically connecting the wiring substrate 23 and the detection electrode Rx with each other via the leader wire 24 as illustrated in FIG. 8. Here, from a viewpoint of reducing influence of the leader wire 24 onto a signal to be transmitted to the wiring substrate 23, it is preferred to form the leader wire 24 by using a metal material so as to reduce its impedance component. The touch detection base member 20 illustrated in FIG. 8 is manufactured separately from the display device LCD1 illustrated in FIG. 6, and therefore, for example, a metal-film forming technique such as a sputtering method can be applied when the leader wire 24 is formed. Therefore, the leader wire 24 can be made of the metal material so as to reduce its impedance component. Moreover, by forming the leader wire 24 by using the metal material, a wire width can be thinned, and therefore, a layout space for the leader wire 24 cane be reduced. Therefore, the total planar size of the display device LCD2 with the input device (see FIG. 6) can be reduced.

Moreover, from a viewpoint of improving processability of the detection electrode Rx, the substrate 21 is preferred to be a glass plate. Further, as the substrate 21, it is particularly preferred to use a so-called reinforced glass which is subjected to a process for compressing a surface of a glass plate so as to improve fracture resistance. However, when the substrate 21 is the glass plate, a weight of the substrate 21 is increased, and therefore, the weight of the substrate 21 can be decreased by forming it by using a resin material. In this case, on the front surface 21a side to be externally exposed, it is preferred to provide a protective layer (or a hard coat layer that is subjected to a treatment for hardening it more than the back surface 21b side) for protecting the substrate 21 from damages.

Figure 9:
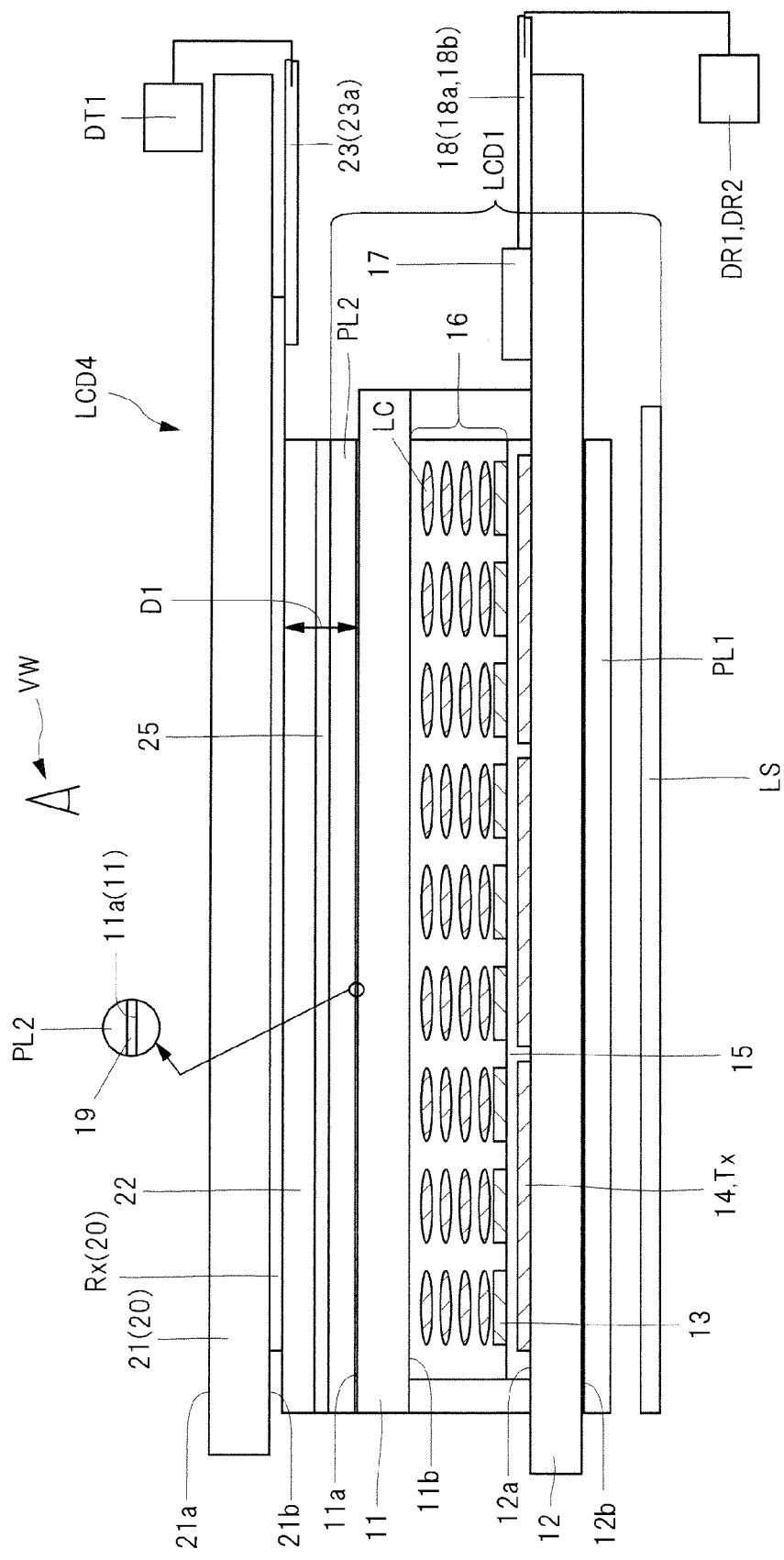
FIG. 9 is a cross-sectional diagram of a principal part illustrating a modification example of FIG. 6.

Moreover, in the display device LCD2 with the input device illustrated in FIG. 6, only the adhesive layer 19, the polarizing plate PL2, the adhesive layer 22 and the detection electrodes Rx are illustrated between the substrate 21 and the substrate 11 in order to easily illustrate the configuration in which the touch detection base member 20 separately from the display device LCD1 is provided so as to be separated apart therefrom and also so as to face each other and show the resulting effect. However, it is not excluded that an additional member is arranged between the substrate 21 and the substrate 11. For example, as illustrated in FIG. 9, a conductor layer (or charge relaxation layer) 25 can be provided between the substrate 21 and the substrate 11 as a charge relaxation layer for suppressing malfunction due to electro static discharge (ESD). FIG. 9 is a cross-sectional diagram of a principal part illustrating a modification example of FIG. 6.

A display device LCD4 with an input device illustrated in FIG. 9 is different from the display device LCD2 with the input device illustrated in FIG. 6 in that the conductor layer 25 is provided between the substrate 21 and the substrate 11. This is the same as the display device LCD2 with the input device in other points, and therefore, overlapped explanations will be omitted. The conductor layer 25 provided in the display device LCD4 with the input device functions as the charge relaxation layer provided for preventing or suppressing the malfunction of the display device LCD1 due to the influence of the ESD. The static electricity is applied in some cases such as the manufacturing process for the display device LCD1 and the usage of a completed product (for example, the display device LCD4 with the input device) by a user. The application of the static electricity to the display device LCD1 causes malfunction such as display disturbance. Therefore, when the static electricity is applied to the component member of the display device LCD1, it is preferred to take out the charge caused by the static electricity.

Accordingly, in the LCD4 with the input device illustrated in FIG. 9, the conductor layer 25 is formed above the polarizing plate PL2 so that the electrical charge charged in the display device LCD1 is taken outside through the conductor layer 25. The conductor layer 25 forms a passage through which the charge caused by the static electricity is taken outside, and therefore, is required to have the conductive property. However, even when a sheet resistance value of the conductor layer 25 is larger than a sheet resistance value of the detection electrode Rx, a sufficient effect as the charge relaxation layer is obtained. Also, when the resistance value of the conductor layer 25 is too low, this causes a reduction in the detection sensitivity of an input position by the detection electrodes Rx. This is because, in the case of the input device of the electrostatic capacitive type, it is difficult to detect the change in the electrostatic capacity when a conductive member having a low resistivity is arranged between capacitive elements because the conductive member functions as a shield. Therefore, it is preferred that the conductor layer 25 is made of a material having a sheet resistance value larger than that of the detection electrode Rx, such as a conductive resin layer obtained by mixing conductive particles with a resin material. Moreover, for example, a transparent conductive material such as ITO can be also used. In this case, it is preferred that the material has a sheet resistance value larger than that of the detection electrode Rx. The preferable sheet resistance value of the conductor layer 25 is, for example, about $10^7 \Omega$ to $10^{11} \Omega$.

Moreover, when the conductor layer 25 is adhesively fixed to the polarizing plate PL2 via the adhesive layer 19 as the display device LCD4 with the input device, the adhesive layer 22 is interposed between the conductor layer 25 and the detection electrode Rx. Therefore, if the adhesive layer 22 is made of an insulating material, the short-circuit of each of the plurality of detection electrodes Rx (see FIG. 8) can be reliably prevented via the conductor layer 25. In this case, the conductor layer 25 is formed on the polarizing plate PL2, and therefore, it is difficult to apply the high-temperature process to the process for forming the conductor layer 25. However, as described above, since it is preferred that the sheet resistance value of the conductor layer 25 is larger than the sheet resistance value of the detection electrode Rx, it can be formed by using a low-temperature process.

Figure 10:
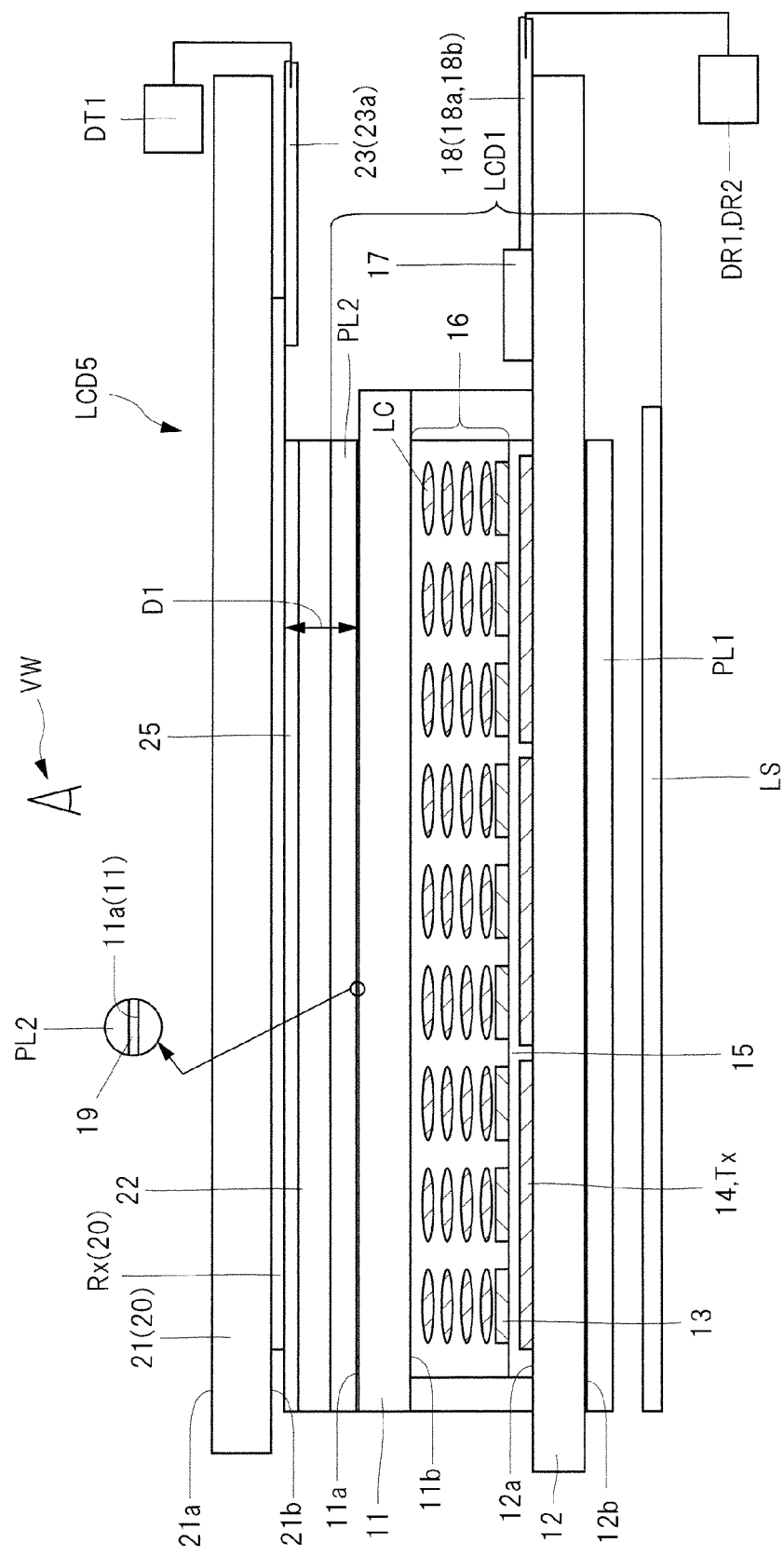
FIG. 10 is a cross-sectional diagram of a principal part illustrating a modification example of FIG. 9.
Figure 11:
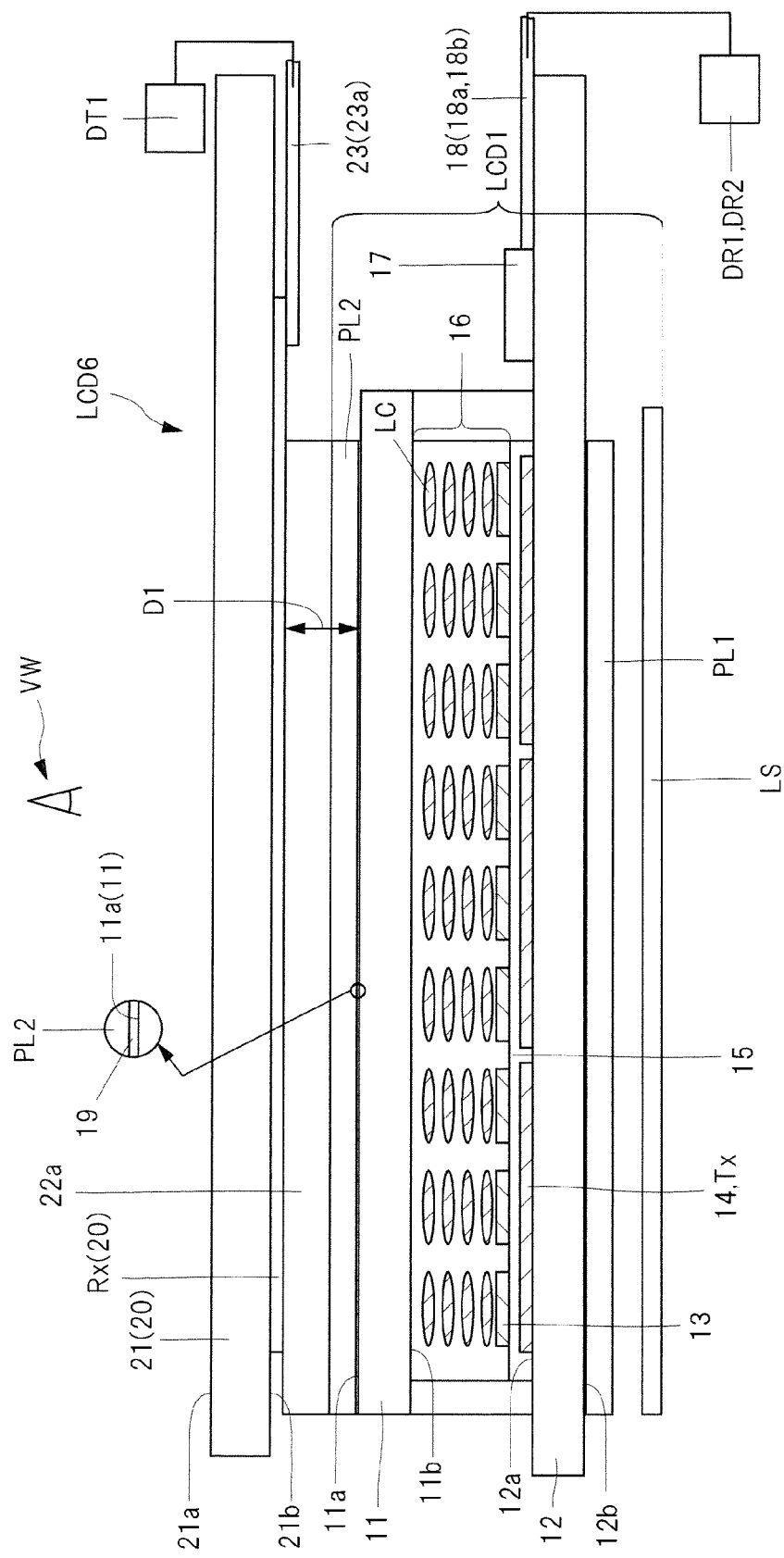
FIG. 11 is a cross-sectional diagram of a principal part illustrating another modification example of FIG. 9.

Moreover, as described above, the conductor layer 25 functions as the charge relaxation layer even when it has the large sheet resistance value. Therefore, as a modification example of FIG. 9, for example, it may be not required that the conductor layer 25 and the detection electrode Rx are insulated from each other as illustrated in FIGS. 10 and 11. FIG. 10 is a cross-sectional diagram of a principal part illustrating the modification example of FIG. 9, and FIG. 11 is a cross-sectional diagram of a principal part illustrating another modification example of FIG. 9.

A display device LCD5 with an input device illustrated in FIG. 10 is different from the display device LCD4 with the input device illustrated in FIG. 9 in that the detection electrode Rx formed on the substrate 21 are in contact with the conductor layer 25. Moreover, a display device LCD6 with an input device illustrated in FIG. 11 is different from the display device LCD4 with the input device illustrated in FIG. 9 in that, although the conductor layer 25 is not formed, conductive particles are mixed into an adhesive layer 22a for adhesively fixing the substrate 21 and the polarizing plate PL2 to each other instead of the formation. In other words, in the display device LCD6 with the input device illustrated in FIG. 11, the conductor layer is included in the adhesive layer 22a. Therefore, the adhesive layer 22a has both of an adhesive function for adhesively fixing the touch detection base member 20 and the display device LCD1 to each other and the function of the above-described charge relaxation layer. The other portions are the same as those of the display device LCD4 with the input device, and therefore, overlapped explanations will be omitted.

When the detection electrode Rx and the conductor layer 25 are in contact with each other as the display device LCD5 with the input device illustrated in FIG. 10, the efficiency for taking out the electrical charge charged in the conductor layer 25 from the detection electrode Rx is improved, and therefore, the ESD resistance can be further improved than that of the display device LCD4 with the input device illustrated in FIG. 9. However, when the detection electrode Rx and the conductor layer 25 are in contact with each other, it is preferred that the detection electrode Rx and the conductor layer 25 are in contact with each other within a range, for example, in which the short circuit of each of the plurality of detection electrodes Rx illustrated in FIG. 8 is not caused via the conductor layer 25. The erroneous detection due to the contact of the conductor layer 25 with the detection electrode Rx can be suppressed by setting the sheet resistance value of the conductor layer 25 sufficiently larger than the sheet resistance value of the detection electrodes Rx. However, from a viewpoint of more reliably preventing the erroneous detection, it is preferred that the conductor layer 25 is the conductive resin layer obtained by mixing the conductive particles with the resin material. Moreover, it is preferred that particle sizes of the conductive particles are smaller than the separated distance between the detection electrodes Rx adjacent to each other.

Moreover, when the detection electrode Rx and the conductor layer 25 are in contact with each other as the display device LCD5 with the input device illustrated in FIG. 10, the conductor layer 25 can be formed in the manufacturing process for the touch detection base member 20. Therefore, the degree of freedom of selecting the material of the conductor layer 25 is improved. For example, when a conductive resin paste obtained by mixing the conductive particles with a paste-like resin material is used for forming the conductor layer 25, the paste can be applied onto the plurality of detection electrodes Rx formed on the back surface 21b of the substrate 21 illustrated in FIG. 8. In this case, the conductive resin paste is buried between the detection electrodes Rx adjacent to each other, and therefore, the electrostatic capacity of the capacitive element C1 illustrated in FIG. 1 can be stabilized. As a result, the detection accuracy of the input position is improved, and therefore, the detection reliability can be improved. Moreover, by reducing a space between the detection electrodes Rx adjacent to each other, display light can be stably transmitted.

Moreover, as the display device LCD4 with the input device illustrated in FIG. 9 and the display device LCD5 with the input device illustrated in FIG. 10, when the conductor layer 25 is arranged between the polarizing plate PL2 and the detection electrode Rx, it is preferred that the refractive index of the conductor layer 25 is set to a value between the refractive index of the detection electrode Rx and the refractive index of the adhesive layer 22 or the polarizing plate PL2 for index matching.

Moreover, as the display device LCD6 with the input device illustrated in FIG. 11, when the conductive particles are mixed into the adhesive layer 22a for adhesively fixing the substrate 21 and the polarizing plate PL2 to each other, the process for forming the conductor layer 25 as illustrated in FIGS. 9 and 10 can be removed. Therefore, its manufacturing process can be more simplified than those of the display device LCD4 with the input device illustrated in FIG. 9 and the display device LCD5 with the input device illustrated in FIG. 10. However, from a viewpoint of stably arranging the charge relaxation layer in vicinity of the detection electrode Rx, it is preferred that the conductor layer 25 is formed separately from the adhesive layer 22 as illustrated in FIGS. 9 and 10.

<Preferable Thickness of Adhesive Layer>

Next, regarding a preferable value of the thickness of the adhesive layer 22 (adhesive layer 22a in the case of FIG. 11) for adhesively fixing the touch detection base member 20 and the display device LCD1, results studied by the inventors of the present application will be explained. FIGS. 12A and 12B are explanatory diagrams illustrating the results studied by the inventors of the present application regarding the thickness of the adhesive layer for adhesively fixing the touch detection base member of the display device with the input device illustrated in FIG. 6 and the display device. The evaluation results illustrated in FIGS. 12A and 12B show results studied on a correlation between the thickness of the adhesive layer 22 and the detection accuracy with changing the thickness of the adhesive layer 22 illustrated in FIG. 6. Note that the evaluations illustrated in FIGS. 12A and 12B have been made by preparing two types of the display device LCD1 having the different thicknesses of the substrate 11 and the polarizing plate PL2 illustrated in FIG. 6 from each other, and changing the thickness of the adhesive layer 22 for each of them. In the evaluation result illustrated in an upper column of FIG. 12A, it has been set that the thickness of the substrate 11 is 300 μm ("relative dielectric constant/thickness" thereof is 0.020) and the thickness of the polarizing plate PL2 is 100 μm ("relative dielectric constant/thickness" thereof is 0.030). Moreover, in the evaluation result illustrated in a lower column of FIG. 12B, it has been set that the thickness of the substrate 11 is 600 μm ("relative dielectric constant/thickness" thereof is 0.010) and the thickness of the polarizing plate PL2 is 150 μm ("relative dielectric constant/thickness" thereof is 0.020). The detection accuracy (Accuracy) of the input position has been used as an evaluation index. The detection accuracy of the input position is an index indicating a degree of an error in coordinate detection, and the detection accuracy of small- to middle-sized touch panels is generally preferably ±2.0 mm or less.

Moreover, in the evaluations illustrated in FIGS. 12A and 12B, it is set that "relative dielectric constant/thickness" of the single adhesive layer 22 is indicated by "A1" and set that "relative dielectric constant/thickness" of a stacking body obtained by combining the layers of the substrate 11, the adhesive layer 19, the polarizing plate PL2, and the adhesive layer 22 with each other (hereinafter, simply referred to as a stacking body in the explanation of FIGS. 12A and 12B) is indicated by "A2", a correlation between "A2/A1" and the detection accuracy has been also evaluated. More specifically, when the thickness of the adhesive layer 22 in the upper column of FIG. 12A is 100 μm, with taking 500 μm of the thickness of the adhesive layer 22 in the lower column of FIG. 12B as a reference value, it is evaluated within what range the difference from this reference value is so that the detection accuracy is within ±2.0 mm.

As illustrated in FIG. 12A, when a relatively-thin substrate 11 having a thickness of 300 μm is applied, it has been found that the detection accuracy can be within ±2.0 mm when the thickness of the adhesive layer 22 is within a range of 60 μm or thicker but 160 μm or thinner. More particularly, in a range of the thickness of the adhesive layer 22 which is within 80 μm or thicker but 120 μm or thinner, the detection accuracy is within ±0.4 mm, and therefore, a touch panel with high accuracy can be obtained. On the other hand, as illustrated in FIG. 12B, when a substrate 11 having a thickness of 600 μm is applied, it has been found that the detection accuracy can be within ±2.0 mm when the thickness of the adhesive layer 22 is within a range of 400 μm or thicker but 700 μm or thinner. Based on the above-described facts, in the case of the substrate 11 having the thickness of 300 μm or thicker, it is preferred that the thickness of the adhesive layer 22 is at least 60 μm or thicker.

Moreover, when sections showing the difference from each reference value in FIGS. 12A and 12B are viewed, it has been found that the detection accuracy can be within ±2.0 mm in both of the cases of FIGS. 12A and 12B when the difference from each reference value is within ±10%. As the difference from each reference value illustrated in FIGS. 12A and 12B, when a value (% value) of "A2/A1" in the minimum detection accuracy (detection error) is taken as the reference value, a degree of shift from the reference value is expressed in terms of "%". That is, when variation in the thickness of the adhesive layer 22 illustrated in FIG. 6 occurs, a degree of the variation is set to be within a predetermined range, so that the distribution of the detection accuracy on an input surface of the input device can be uniformed. As this predetermined range, a value of the difference from each reference value illustrated in FIGS. 12A and 12B may be within ±10%.

However, as described above, in order to make the external force applied to the substrate 21 serving as the covering member difficult to transmit to the substrate 11, the adhesive layer 22 is made of a resin material having elasticity lower than that of the substrate 11. Therefore, as different from a plate material formed so as to previously have a certain thickness, when the substrate 21 and the display device LCD1 are adhesively fixed to each other, a thickness thereof is adjusted, and therefore, a technique for reducing the variation in the thickness of the adhesive layer 22 is required. Accordingly, the inventors of the present application have studied on the technique for reducing the variation in the thickness of the adhesive layer 22.

<Technique for Controlling Thickness of Adhesive Layer>

Figures 13, 14:
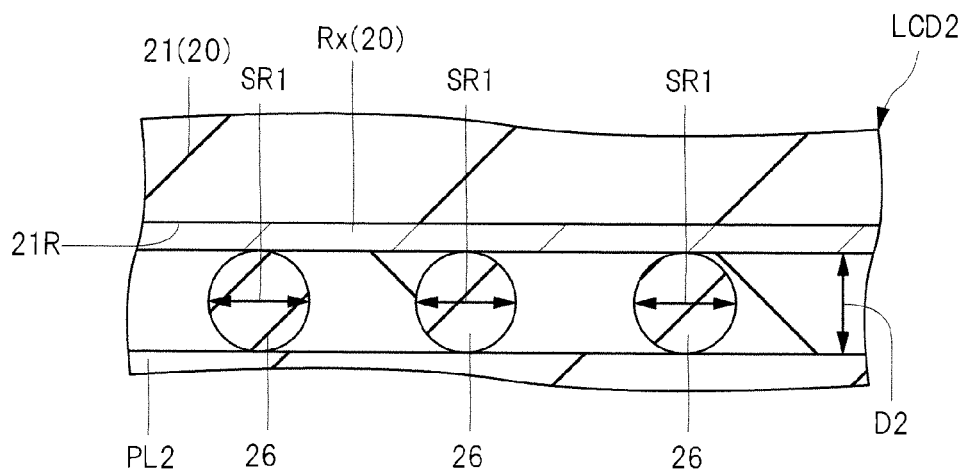
FIG. 13 is an enlarged cross-sectional diagram illustrating an enlarged adhesion interface between the touch detection base member and the display device illustrated in FIG. 6.
FIG. 14 is an explanatory diagram illustrating results of evaluation on a relation between visibility and refractive index of a spacer member illustrated in FIG. 13.

FIG. 13 is an enlarged cross-sectional diagram illustrating an enlarged adhesion interface between the touch detection base member and the display device illustrated in FIG. 6. Note that how to control the thickness of the adhesive layer 22 will be explained below by exemplifying the application of the display device LCD2 with the input device illustrated in FIG. 6 for easily understanding. However, the technique can be applied to other modification examples described above and later.

As illustrated in FIG. 13, into the adhesive layer 22, a plurality of spacer members 26 for defining a thickness D2 of the adhesive layer 22 are mixed. Each of the spacer members 26 has a spherical shape in an example illustrated in FIG. 13, and diameters SR1 of the plurality of spacer members 26 are uniformed. Note that the expression that the diameters SR1 of the plurality of spacer members 26 are uniformed means that the diameters SR1 of the plurality of spacer members 26 have almost the same value as each other. Even when those having a different diameter value are contained due to, for example, influences of the processing precision or the others, this state is allowed. Moreover, the elasticity of the spacer members 26 is higher than the elasticity of the adhesive layer 22.

As described above, by mixing the plurality of spacer members 26 whose diameters SR1 are uniformed into the adhesive layer 22, the plurality of spacer members 26 are sandwiched between the polarizing plate PL2 and the detection electrodes Rx (or the back surface 21b of the substrate 21) so as to be in contact with both of them. In this manner, the thickness D2 of the adhesive layer 22 is defined by the diameters SR1 of the spacer members 26. That is, the diameters SR1 of the plurality of spacer members 26 are uniformed, so that the variation in the thickness D2 of the adhesive layer 22 can be reduced.

Here, in consideration of the influence on the visible light passing through the adhesive layer 22, it is preferred to use a transparent material with respect to the visible light for each of the spacer members 26. Moreover, when the refractive indexes of the resin material forming the adhesive layer 22 and the spacer members 26 are equal to each other, the spacer members 26 are not visually recognized. However, since the thickness D2 of the adhesive layer 22 is set to at least 60 μm or thicker, preferably 100 μm or thicker as described above, the diameters SR1 of the spacer members 26 are also correspondingly set to at least 60 μm or thicker. According to the study by the inventors of the present application, it has been found that the spacer members 26 are easily visually recognized when the diameters SR1 of the spacer members 26 are large.

FIG. 14 is an explanatory diagram illustrating an evaluation result regarding a relation between the visibility and the refractive index of the spacer members illustrated in FIG. 13. The evaluation illustrated in FIG. 14 shows a correlation among the refractive index of the adhesive layer 22 and the refractive index of the spacer members 26 illustrated in FIG. 13 and the visibility of the spacer members 26. More specifically, when it is assumed that the refractive index of the adhesive layer 22 is "R1" and that the refractive index of the spacer members is "R2", a relation between a ratio of "(R1−R2)/(R1+R2)" and an evaluation result obtained by a visual inspection is shown. Moreover, in the evaluation illustrated in FIG. 14, the visibility has been verified by preparing three types of the adhesive layer 22 having different refractive indexes (R1) from each other and changing the refractive index (R2) of the spacer members 26. Moreover, in a section of the evaluation of the visibility illustrated in FIG. 14, the evaluation results in cases that the diameters SR1 of the spacer members 26 illustrated in FIG. 13 are 200 μm and 500 μm are shown. As a method of the evaluation, when the display device LCD2 with the input device is visually viewed from the viewer VW side illustrated in FIG. 6, a cross mark (x) is added if the spacer members 26 can be visually recognized, and a circle mark (o) is added if it cannot be visually recognized.

As illustrated in FIG. 14, the correlation between "(R1−R2)/(R1+R2)" and the visibility of the spacer members 26 has been verified. That is, in the case that the diameters SR1 of the spacer members 26 illustrated in FIG. 13 are 200 μm or smaller, by setting the value of (R1−R2)/(R1+R2) to be within ±0.3%, the spacer members 26 are almost not visually recognized. Moreover, in the case that the diameters SR1 of the spacer members 26 are 500 μm or smaller, by setting the value of (R1−R2)/(R1+R2) to be within ±2.0%, the spacer members 26 are almost not visually recognized.

According to the present embodiment, even in a case that such large spacer members 26 as having the diameter SR1 exceeding 60 μm or larger are mixed into the adhesive layer 22, the reduction in the display reliability due to the spacer members 26 can be suppressed by uniforming the refractive index of the adhesive layer 22 and the refractive index of the spacer members 26 within the above-described range.

<Method of Manufacturing Display Device with Input Device>

Next, a method of manufacturing the display device with the input device explained in the present embodiment will be explained. Note that, while the following explanation will be made by exemplifying a method of manufacturing the display device LCD2 with the input device illustrated in FIG. 6 as a typical example, only different points therefrom will be briefly explained for other modification examples.

Figure 15:
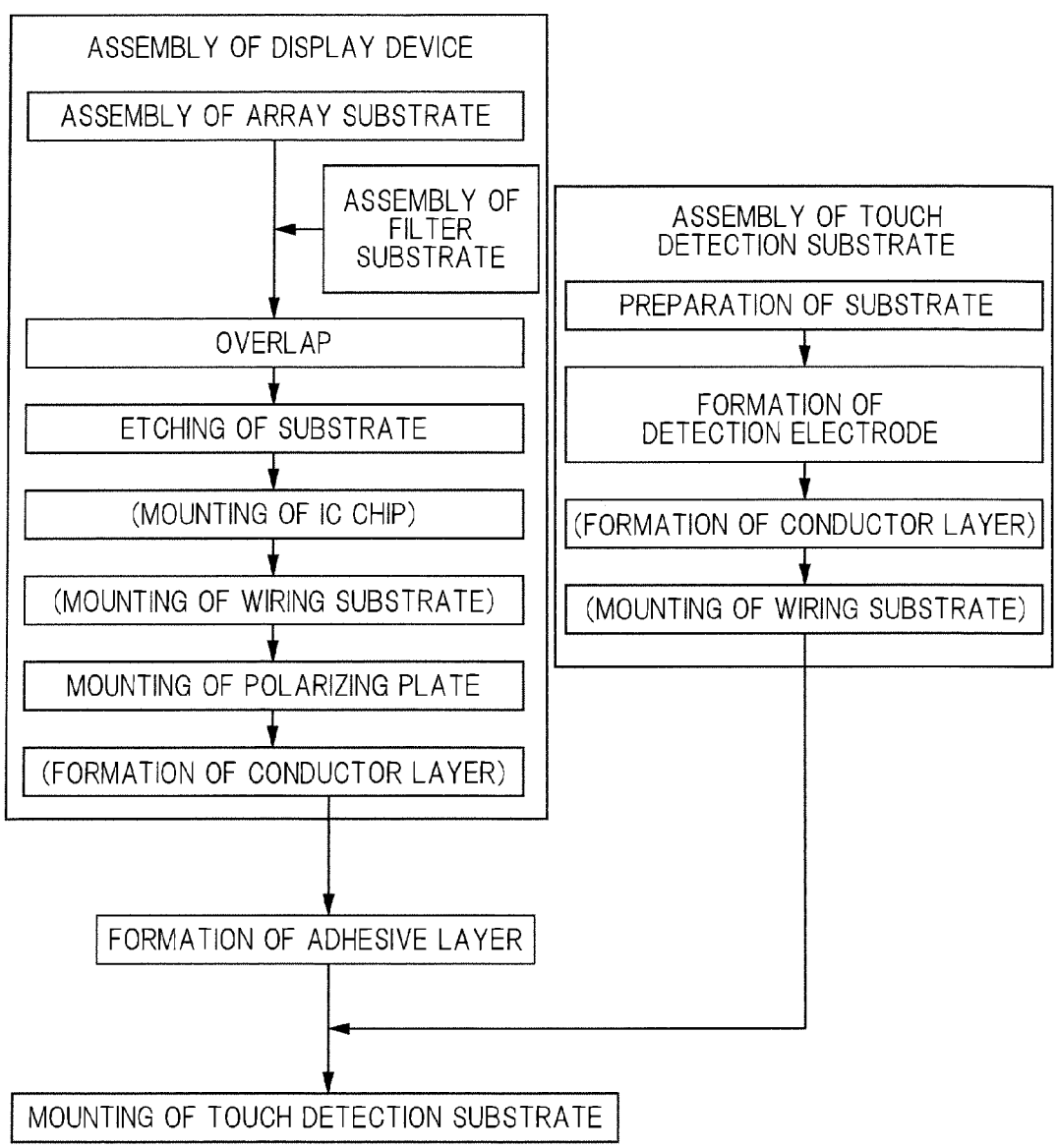
FIG. 15 is an assembly flow diagram illustrating an outline of manufacturing processes of the display device with the input device illustrated in FIG. 6.

FIG. 15 is an assembling flow diagram illustrating the outline of the manufacturing process for the display device with the input device illustrated in FIG. 6. Note that specific members described in the following explanation will be explained appropriately with reference to the above-described FIGS. 5 to 11.

As illustrated in FIG. 15, the method of manufacturing the display device with the input device of the present embodiment includes an assembly process of the display device, an assembly process of the touch detection base member, and a mounting process of the touch detection base member.

First, in the assembly process of the display device, each member of the LCD1 illustrated in FIG. 6 except for the light source LS is assembled. As illustrated in FIG. 15, the present process includes: an assembly process of the array substrate; a preparation process of the filter substrate; and an overlap process.

In the assembly process of the array substrate, on the front surface 12a of the substrate 12 illustrated in FIG. 6 in which a TFT has been previously formed, each member is sequentially formed. That is, the common electrode 14, the insulating layer 15, and the pixel electrode 13 are sequentially formed on the front surface 12a of the substrate 12. Here, while the common electrode 14 and the pixel electrode 13 are formed by using a transparent electrode material such as ITO or others, they can be heated as long as prior to the formation of the liquid crystal layer 16. Therefore, the common electrode 14 and the pixel electrode 13 are heated prior to the formation of the liquid crystal layer 16 at a temperature of, for example, about 200° C. or higher, so that the resistance values of the common electrode 14 and the pixel electrodes 13 can be reduced, or the visible light transmittance can be improved. Note that, in the present process, for example, an orientation film and others are formed in addition to the common electrode 14, the insulating layer 15, and the pixel electrode 13 illustrated in FIG. 6. Moreover, the liquid crystal layer 16 can be formed after the formation of the pixel electrode 13 in the assembly process of the array substrate. Moreover, as a modification example, this also can be formed by injecting liquid crystals LC between the substrate 11 and the substrate 12 after the overlap process illustrated in FIG. 15.

Further, the substrate 11 illustrated in FIG. 6 corresponds to the filter substrate illustrated in FIG. 15. In the assembly process of the filter substrate, the substrate 11 illustrated in FIG. 6 is prepared, and, for example, the orientation film not illustrated or others is formed on the back surface 11b side. In the assembly process of the filter substrates, not the orientation film but, for example, a color filter or others can be formed. However, since the substrate 11 is thinned in a substrate etching process illustrated in FIG. 15, the members to be arranged on the back surface 11b side of the substrate 11 are formed in the present process.

Moreover, in the overlap process illustrated in FIG. 15, relative positions of the substrate 11 and the substrate 12 in a plan view are aligned with each other so that the back surface 11b of the substrate 11 and the front surface 12a of the substrate 12 are overlapped so as to face each other. If the liquid crystal layer 16 has been already formed, the liquid crystal layer 16 is filled between the substrate 11 and the substrate 12 by the present process.

Next, in the substrate etching process illustrated in FIG. 15, a part of each of the front surface 11*a* side of the substrate 11 and the back surface 12*b* side of the substrate 12 is removed, and they are thinned. In this manner, by overlapping the substrate 11 and the substrate 12 with each other, and then, thinning each of the substrate 11 and the substrate 12, damages on the substrates 11 and 12 can be suppressed in the respective processes from the assembly process of the array substrate to the overlap process.

Moreover, in a mounting process of an IC chip and a mounting process of a wiring substrate shown in parentheses in FIG. 15, the semiconductor chip 17 and the wiring substrate 18 illustrated in FIG. 6 are mounted. At this time, a leader wire (whose illustration is omitted) electrically connected to each of the common electrode 14 and the pixel electrode 13 is formed on the front surface 12*a* side of the substrate 12. In the present process, the leader wire and a plurality of terminals (whose illustration is omitted) formed on the wiring substrate 18 are electrically connected to each other. As described above, the wiring substrate 18 is, for example, a flexible wiring plate. While a method of the electrical connection is not particularly limited, the electrical connection can be achieved without using a joining material such as solder by, for example, performing the connection (or a press-bonding connection) via a so-called anisotropic conductive film (ACF) in which a conductive member (such as conductive particles) for forming a conductive passage is buried inside a resin film. The semiconductor chip 17 can be also similarly electrically connected to the TFT via the anisotropic conductive film. Note that a location where the semiconductor chip 17 is mounted as described above is not limited on the substrate 12, and a mounting mode on, for example, the wiring substrate 18 can be also applied. The timing for mounting the wiring substrate 18 also has various modification examples, and the mounting can be performed, for example, prior to the substrate etching process or subsequent to a mounting process of a polarizing plate. However, from a viewpoint of preventing the damages on the wiring substrate 18 due to the substrate etching process, the mounting is preferably performed subsequent to the substrate etching process as illustrated in FIG. 15. Moreover, from a viewpoint of preventing the damages on the polarizing plates PL1 and PL2 in the connection of the wiring substrate 18, the mounting is preferably performed prior to the mounting process of the polarizing plate.

Moreover, in the mounting process of the polarizing plate illustrated in FIG. 15, the polarizing plates PL1 and PL2 illustrated in FIG. 6 are mounted. In this process, via, for example, a film-shaped adhesive film 19, the polarizing plate PL1 is adhesively fixed onto the base surface 12*b* of the substrate 12 and the polarizing plate PL2 is adhesively fixed onto the front surface 11*a* of the substrate 11, respectively.

Note that, when the polarizing plate PL2 is adhesively fixed onto the front surface 11*a* of the substrate 11 via the adhesive layer 19 as the display device LCD4 with the input device illustrated in FIG. 9, a formation process of a conductor layer is performed after the mounting process of the polarizing plate as shown in parentheses in FIG. 15. On the other hand, in the cases of the display devices LCD2, LCD5, and LCD6 with the input device illustrated in FIGS. 6, 10, and 11, the formation process of the conductor layer after the mounting process of the polarizing plate is not performed.

Moreover, in the present embodiment, the touch detection base member 20 is formed separately from the display device LCD1 as described above, and therefore, an assembly process of the touch detection base member is included as illustrated in FIG. 15. This process can be performed independently from the assembly process of the display device, and therefore, an order of this process is not limited to prior or subsequent to the assembly process of the display device.

This assembly process of the touch detection base member includes a preparation process of a substrate for preparing the substrate 21 illustrated in FIG. 6. Moreover, the assembly process of the touch detection base member also includes a formation process of a detection electrode for forming the plurality of detection electrodes Rx in such a pattern as illustrated in FIG. 8. In this formation process of the detection electrode, a transparent electrode material such as ITO is uniformly formed on the back surface 21*b* side of the substrate 21, and then, unnecessary parts are removed so that such a pattern as illustrated in FIG. 8 is formed. Moreover, in the formation process of the detection electrode, the heating process is performed at a temperature of, for example, about 200° C. or higher, so that the resistance values of the detection electrodes Rx can be reduced. Further, the visible light transmittance of the detection electrodes Rx can be improved. Still further, when a metallic leader wire 24 as illustrated in FIG. 8 is formed, this can be formed subsequent to the detection of the detection electrodes Rx or prior to the formation of the detection electrodes Rx by using a metal film forming technique such as a sputtering method.

Here, when the detection electrodes Rx are formed on the front surface 11*a* of the substrate 11 as the display device LCD3 with the input device illustrated in FIG. 7, they are formed subsequent to the substrate etching process but prior to the mounting process of the polarizing plate illustrated in FIG. 15. Since the liquid crystal layer 16 has already been formed at this moment, it is preferred to suppress the temperature to be applied upon the formation of the detection electrodes Rx at about 70° C. at the highest or lower in order to suppress the degradation in the liquid crystals LC. That is, in the display device LCD2 with the input device illustrated in FIG. 6, the detection electrodes Rx are formed on the substrate 21 not configuring the display device LCD1, so that such a high temperature as about 200° C. can be applied upon the formation of the detection electrodes Rx.

Next, in the cases of the display device LCD2 with the input device illustrated in FIG. 6 and the display device LCD6 with the input device illustrated in FIG. 11, the sequence proceeds to the detection process of the touch detection base member after the mounting process of the wiring substrate illustrated in FIG. 15. However, in the case of the display device LCD5 with the input device illustrated in FIG. 10, the sequence proceeds to a formation process of a conductor layer. The conductor layer forming process is performed subsequent to the formation process of the detection electrode but prior to the mounting process of the touch detection base member. In this process, by applying the conductive resin material prepared by mixing the conductive particles into the paste-like resin material, the plurality of detection electrodes Rx illustrated in FIG. 8 are coated therewith. Then, by hardening the resin component of the conductive resin material, the conductor layer 25 covering the plurality of detection electrodes Rx is obtained. The preferable aspects of the conductor layer 25 such as the sheet resistance value have already been explained, and therefore, overlap explanations will be omitted.

As described above, by applying the production method of applying the paste-like material, the conductive resin material can be buried between the detection electrodes Rx adjacent to each other. Therefore, the electrostatic capacity of the capacitive element C1 illustrated in FIG. 1 can be stabilized. As a result, the detection accuracy of the input position can be improved, and therefore, the detection reliability can also be improved. Moreover, by reducing the space between the detection electrodes Rx adjacent to each other, the display light can be stably transmitted.

Next, as illustrated in FIG. 15, the assembly process of the touch detection base member includes a mounting process of a wiring substrate. In this mounting process of the wiring substrate, a wiring substrate 23 such as a flexible wiring plate is electrically connected to a plurality of terminals formed on the back surface 21b of the substrate 21. While a method for the electrical connection is not particularly limited, the electrical connection can be achieved without using a joining material such as solder by performing the connection (or press-bonding connection) via an anisotropic conductive film as similar to the above-described wiring substrate 18.

Note that the present process can be removed in a case of an aspect of no jointing of the wiring substrate 23 although a detailed description will be made later, and therefore, the corresponding process is shown in parentheses in FIG. 15.

Next, a formation process of an adhesive layer is performed as a preparation for a mounting process of a touch detection base member illustrated in FIG. 15. In this process, for example, the adhesive layer 22 is arranged on the polarizing plate PL2 illustrated in FIG. 6. The adhesive layer 22 is made of, for example, an ultraviolet curable resin, and a state thereof before the curing is in a paste state or a liquid state. Therefore, in the present process, by applying the adhesive layer 22 onto the polarizing plate PL2, the paste-state adhesive layer 22 is arranged thereon. By using this paste-state or liquid-state adhesive layer 22 as described above, generation of a space in an adhesion interface of the adhesive layer 22 can be suppressed. For example, even when the detection electrodes Rx and the adhesive layer 22 are tightly adhered to each other as illustrated in FIG. 6, the adhesive layer 22 can be buried inside the space between the detection electrodes Rx adjacent to each other. Note that the adhesive layer 22a illustrated in FIG. 11 to which the conductive particles are mixed can be formed in the same process by previously mixing the conductive particles into a paste-state resin material. Moreover, the same goes for the case of mixing the spacer members 26 as explained with reference to FIG. 13.

Next, as the mounting process of the touch detection base member illustrated in FIG. 15, the touch detection base member 20 is adhesively fixed to the display device LCD1. In the present process, the positions of the display device LCD1 and the touch detection base member 20 are aligned first so that the front surface 11a of the substrate 11 of the display device LCD1 and the back surface 21b of the substrate 21 face each other. At this time, the adhesive layer 22 is applied onto the front surface 11a in the paste state obtained before the curing. Therefore, no large pressing force is required for tightly adhering the touch detection base member 20 and the adhesive layer 22 to each other, and therefore, they can be tightly adhered to each other by simply applying a slight load thereon in addition to a weight of the substrate 21 itself. Moreover, at this time, the adhesive layer 22 is buried between the detection electrodes Rx adjacent to each other so as to fill the space therebetween.

However, when the load required for tightly adhering the touch detection base member 20 and the adhesive layer 22 to each other is small, it is difficult to control the thickness D2 of the adhesive layer (see FIG. 13). Accordingly, as explained with reference to FIG. 13, it is preferred to control the thickness D2 of the adhesive layer 22 by mixing the spacer members 26 into the adhesive layer 22.

After the touch detection base member 20 and the adhesive layer 22 are tightly adhered to each other, the resin component of the adhesive layer 22 is hardened so that the touch detection base member 20 is adhesively fixed. For example, if an ultraviolet curable resin material is used for the adhesive layer 22, the adhesive layer can be hardened by irradiating the layer with an ultraviolet ray, and therefore, the degradation in the liquid crystals LC upon the hardening of the adhesive layer 22 can be prevented or suppressed. By the hardening of the adhesive layer 22, the substrate 21 is fixed to the display device LCD1 in a state that the detection electrodes Rx and the front surface 11a of the substrate 11 are separated apart from each other.

Through the above-described processes, the display device LCD2 with the input device (except for the light source LS) illustrated in FIG. 6 is obtained. Then, the obtained display device LCD2 with the input device is embedded in a housing not illustrated, so that an electronic apparatus in which a touch panel is embedded can be obtained. The light source LS illustrated in FIG. 6 can be previously embedded in the housing.

Note that the different points of the manufacturing methods for the display devices LCD4, LCD5, and LCD6 with the input device illustrated in FIGS. 9, 10, and 11 from the manufacturing method for the display device LCD2 with the input device have been explained, and therefore, overlap explanations will be omitted.

Second Embodiment

Figure 16:
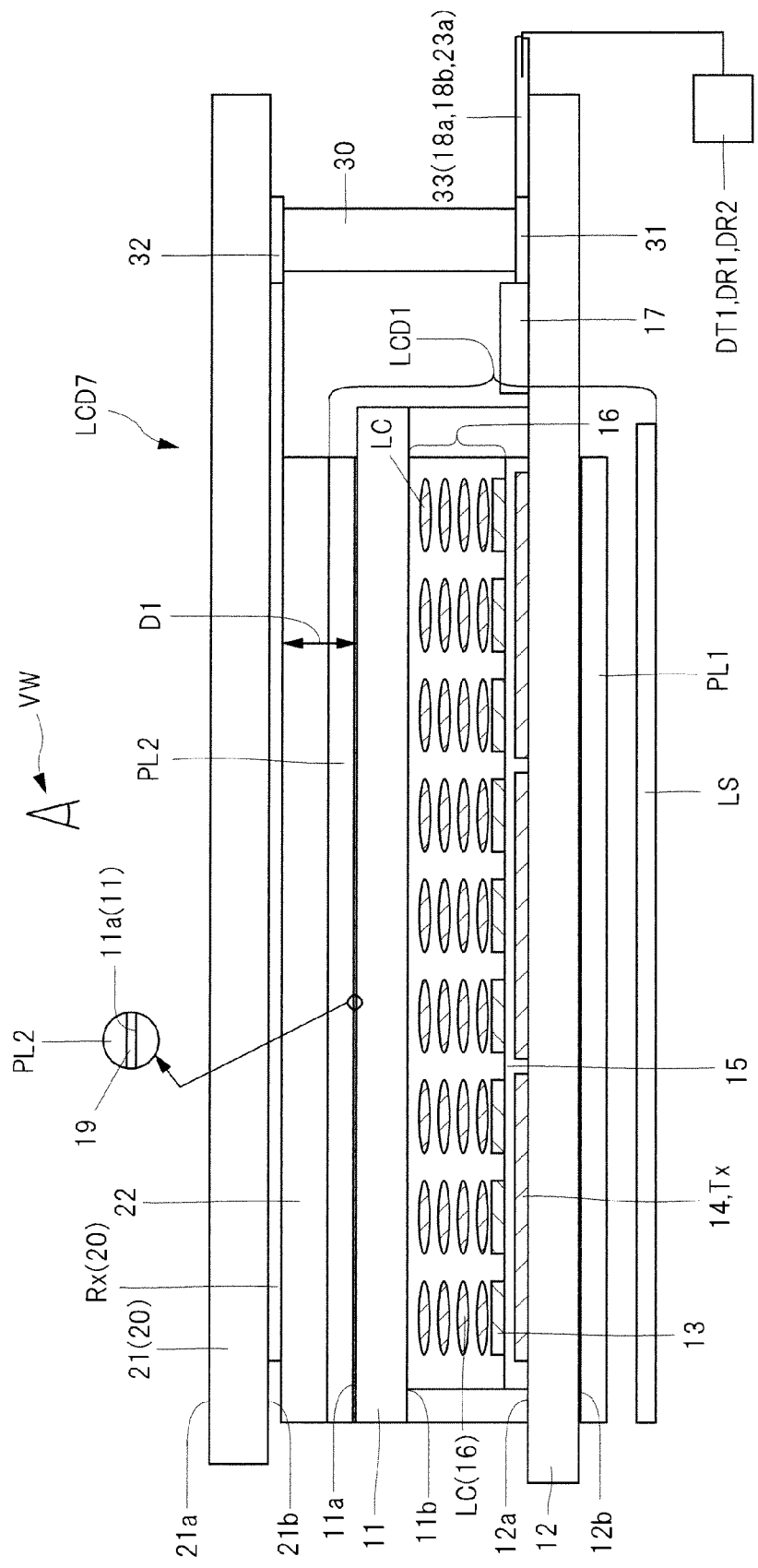
FIG. 16 is an enlarged cross-sectional diagram illustrating a modification example of FIG. 6.
Figure 17:
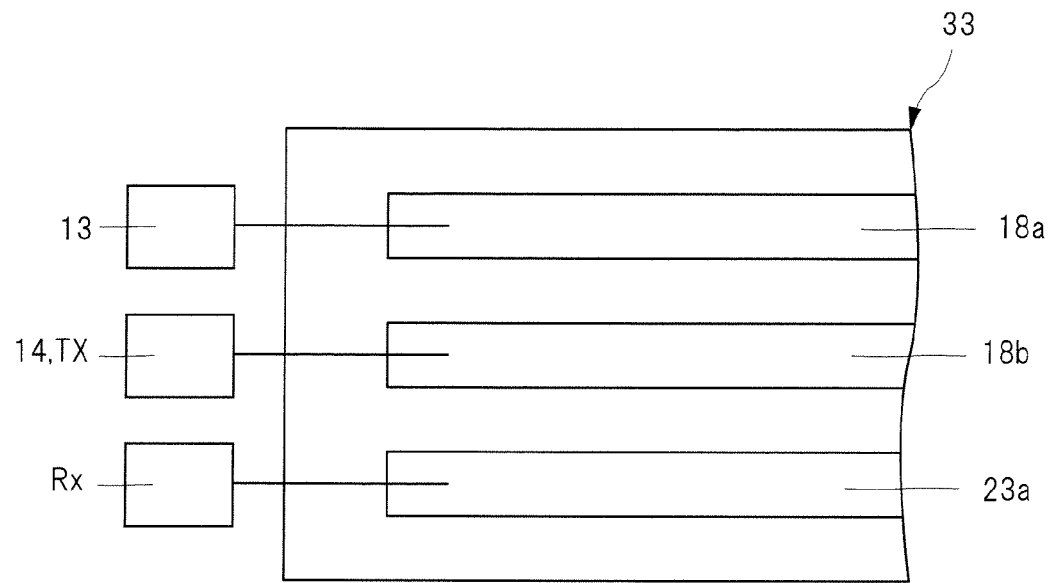
FIG. 17 is an explanatory diagram schematically illustrating an example of a wiring layout in a plan view of a wiring substrate illustrated in FIG. 16.

In the above-described first embodiment, the aspect in which the wiring substrates 18 and 23 are connected to the display device LCD1 and the touch detection base member 20 have been explained. However, from a viewpoint of reducing the number of wiring substrates to be connected to the display device with the input device so as to downsize the mounting space, it is preferred to integrate the wiring substrate 18 and the wiring substrate 23. According to the study by the inventors of the present application, as explained in the above-described embodiment, it has been found that the wiring substrates 18 and 23 are easily integrated particularly when the surface (for example, the back surface 21b) on which the detection electrodes Rx of the touch detection base member 20 are formed and the surface (for example, the front surface 12a) on which the wiring substrate 18 of the display device LCD1 is formed face each other. In the present embodiment, the aspect of the integration of the wiring substrate 23 for the touch detection base member 20 and the wiring substrate 18 for the display device LCD1 explained in the above-described embodiment will be explained. FIG. 16 is an enlarged cross-sectional diagram illustrating a modification example of FIG. 6. Moreover, FIG. 17 is an explanatory diagram schematically illustrating an example of a wiring layout of the wiring substrate illustrated in FIG. 16 in a plan view.

A display device LCD7 with an input device illustrated in FIG. 16 is different from the display device LCD2 with the input device in that the wiring substrate 23 illustrated in FIG. 6 is not provided. On the front surface 12a of the substrate 12 of the display device LCD7 with the input device, a connection terminal 31 is provided. Moreover, on the back surface 21b of the substrate 21 of the display device LCD7 with the input device, a connection terminal 32 is provided. And, the connection terminal 31 and the connection terminal 32 are electrically connected with each other via a conductive member (or an inter-facing-substrate conductive material or conductive member) 30 arranged between the connection terminals 31 and 32.

The connection terminal 31 is electrically connected to the wiring substrate 33 connected to the substrate 12. Moreover, the connection terminal 32 is electrically connected to the detection electrodes Rx. FIG. 16 illustrates the connection terminals 31 and 32 so as to be independent members from each other for easily understanding. However, the connection terminals 31 and 32 are not limited as the independent members. For example, a part of the detection electrodes Rx formed on the substrate 21 can be used also as the connection terminal 32. Moreover, a part of the leader wire formed on the substrate 12 and electrically connected to the pixel electrode 13 or the common electrode 14 but not illustrated can be used as the connection terminal 31. Further, as a conductor member 30 which is a conductive member for electrically connecting the connection terminal 31 and the connection terminal 32 to each other, the following materials can be exemplified. For example, a so-called anisotropic conductive resin can be used as the conductive member 30, the anisotropic conductive resin being obtained by mixing a conductive material (or conductive particles) into a resin base member (or an insulating base member) and electrically connecting between the connection terminal 31 and the connection terminal 32 via this conductive material. Alternatively, a conductive member called a zebra rubber (or an anisotropic conductive rubber) can be used, the zebra rubber for securing a plurality of conductive passages by alternately arranging an insulating material such as rubber and a conductive material connecting between the connection terminals 31 and 32.

Moreover, for example, as similar to the wiring substrate 18 and the wiring substrate 23 illustrated in FIG. 6, the wiring substrate 33 is a so-called flexible wiring plate on which a plurality of wires are formed in a resin film and which can be freely deformed in accordance with a shape of an arrangement location. However, the wires to be formed in the wiring substrate 33 as illustrated in FIG. 17 include a wire 23a to be electrically connected to the plurality of detection electrodes Rx in addition to the wire 18a electrically connected to the pixel electrode 13 and the wire 18b electrically connected to the common electrode 14. Moreover, as illustrated in FIG. 16, the wiring substrate 33 is electrically connected to the driving circuit DR1 for the input device, the driving circuit DR2 for the image display, and the detection circuit DT1 for detecting the input position.

That is, in the display device LCD7 with the input device, the plurality of conductive passages connected to the pixel electrode 13, the common electrode 14 (also used as the driving electrode Tx in FIG. 16), and the detection electrodes Rx are collectively formed on the substrate 12 side within a region where the back surface 21b of the substrate 21 and the front surface 12a of the substrate 12 face each other. In this manner, the wiring substrate 23 for the touch detection base member 20 and the wiring substrate 18 for the display device LCD1 as illustrated in FIG. 6 can be integrated as the wiring substrate 33 illustrated in FIG. 16. Note that the substrate on which the plurality of conductive passages connected to the respective electrodes are collectively formed may be either one of the substrates facing each other. That is, as a modification example although not illustrated, the wiring substrate 33 can be connected onto the substrate 21 side so as to be collectively formed on the substrate 21 side.

Moreover, in the display device LCD7 with the input device, the connection terminal 31 is provided on a peripheral edge of the substrate 12, and the connection terminal 32 is arranged at a position on a peripheral edge of the substrate 21 so as to face the connection terminal 32. In this manner, the conductive member 30 is arranged between the connection terminals 31 and 32 arranged on the peripheral edges of the substrates 12 and 21 so as to face each other, so that the conductive member 30 supports the substrates 12 and 21 on the peripheral edges thereof. That is, the conductive member 30 functions as a reinforcing member for reinforcing the supporting strength of the peripheral edges of the substrates 12 and 21. Moreover, by arranging the connection terminals 31 and 32 so as to face each other on the peripheral edges of the substrates 12 and 21, the space required for electrically connecting the substrates 12 and 21 can be minimized.

The display device LCD7 with the input device is structurally the same as the display device LCD2 with the input device illustrated in FIG. 6 in a point except for the above-described point, and therefore, overlap explanations will be omitted. Moreover, the method of manufacturing the display device LCD7 with the input device illustrated in FIG. 16 is the same as the method of manufacturing the display device with the input device explained with reference to FIG. 15 except for the following point. That is, in the method of manufacturing the display device LCD7 with the input device, the mounting process of the wiring substrate described in the assembly process of the touch detection base member illustrated in FIG. 15 can be removed. Moreover, subsequent to the assembly process of the display device and the assembly process of the touch detection base member, an inter-substrate connection process of electrically connecting the connection terminals 31 and 32 illustrated in FIG. 16 to each other via the conductive member 30 is added. The timing for this inter-substrate connection process varies depending on what conductive material is used as the conductive member 30. For example, when the paste-state anisotropic conductive resin is used, the electrical connection between the substrates can be achieved at one batch in the mounting process of the touch detection base member. Moreover, when the previously-molded anisotropic conductive resin or anisotropic conductive rubber is used, one of end portions of the conductive member 30 is previously press-bonded onto the connection terminal 31 or the connection terminal 32. Then, in the mounting process of the touch detection base member, the other end portion thereof is press-bonded thereon.

Figure 18:
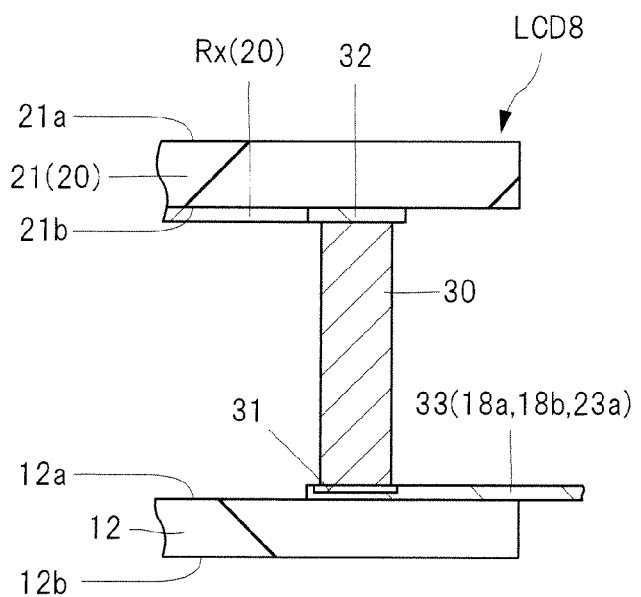
FIG. 18 is an enlarged cross-sectional diagram of a principal part of a first modification example of a connecting portion illustrated in FIG. 16.
Figure 19:
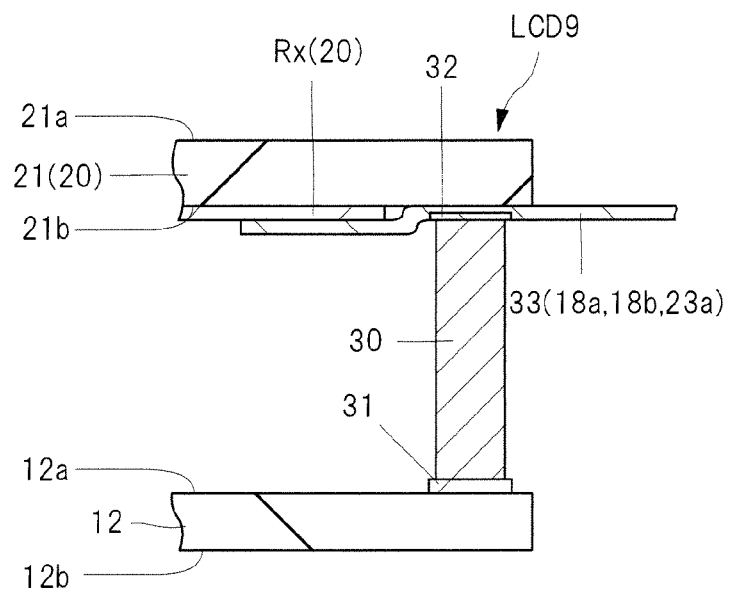
FIG. 19 is an enlarged cross-sectional diagram of a principal part of a second modification example of the connecting portion illustrated in FIG. 16.

Next, a modification example of the display device LCD7 with the input device illustrated in FIG. 16 will be explained. FIG. 18 is an enlarged cross-sectional diagram of a principal part of a first modification example of the connection portion illustrated in FIG. 16. FIG. 19 is an enlarged cross-sectional diagram of a principal part of a second modification example of the connection portion illustrated in FIG. 16. Also, FIG. 20 is an enlarged cross-sectional diagram of a principal part of a third modification example of the connection portion illustrated in FIG. 16.

A display device LCD8 with an input device illustrated in FIG. 18 is different from the display device LCD7 with the input device illustrated in FIG. 16 in that the connection terminal 31 is formed on the wiring substrate 33 and in that the conductive member 30 is electrically connected to the wiring substrate 33 without interposing the substrate 12 therebetween. Moreover, a display device LCD9 with an input device illustrated in FIG. 19 is different from the display device LCD7 with the input device illustrated in FIG. 16 in that the connection terminal 32 is formed on the wiring substrate 33 and in that the conductive member 30 is electrically connected to the wiring substrate 33 without interposing the substrate 21 therebetween. That is, either one of the connection terminals 31 and 32 is formed on the wiring substrate 33.

In this manner, by forming either one of the connection terminals 31 and 32 on the wiring substrate 33, the conductive member 30 can be electrically connected to the wiring substrate 33 without interposing either one of the substrate 12 and substrate 21 therebetween. In this case, the connection resistance between the wiring substrate 33 and the conductive member 30 can be reduced further than the display device LCD7 with the input device illustrated in FIG. 16. For example, an anisotropic conductive film not illustrated is interposed in each connection portion between the conductive member 30 and the connection terminals 31 and 32, so that they can be connected by using a press-bonding method.

Figure 20:
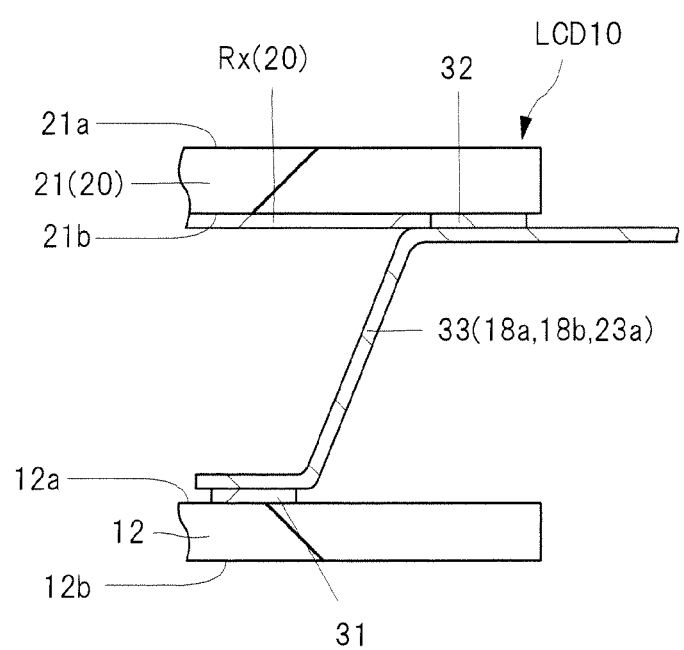
FIG. 20 is an enlarged cross-sectional diagram of a principal part of a third modification example of the connecting portion illustrated in FIG. 16.

Moreover, a display device LCD10 with an input device illustrated in FIG. 20 is different from the display device LCD7 with the input device illustrated in FIG. 16 in that the connection terminals 31 and 32 are electrically connected to each other via the wiring substrate 33 instead of the conductive member 30 illustrated in FIG. 16. That is, the wiring substrate 33 is used also as the function of the conductive member 30 illustrated in FIG. 16 (or the function for electrically connecting between the substrate 21 side and the substrate 12 side). Since the wiring substrate 33 is, for example, the flexible wiring plate as described above, this can be easily connected to both of the connection terminals 31 and 32 by deforming the wiring substrate 33. For example, the anisotropic conductive film not illustrated is interposed in the connection portion between the connection terminals 31 and 32, so that they can be connected to each other by using a press-bonding method.

In the case of the display device LCD10 with the input device illustrated in FIG. 20, the number of parts can be smaller than that of the display device LCD7 with the input device illustrated in FIG. 16 because of the fact that the conductive member 30 is not provided. Moreover, by connecting the connection terminals 31 and 32 by using a member having low strength for supporting the substrates 12 and 21 such as the flexible wiring plate, it is difficult to transmit the external force applied from the substrate 21 to the substrate 12 side. Thus, the damages on the substrate 12 can be suppressed.

Other Modification Example

In the foregoing, the invention made by the inventors of the present application has been concretely described based on the embodiments. However, the present invention is not limited to the foregoing embodiments and various modifications and alterations can be made within the scope of the present invention.

Figure 21:
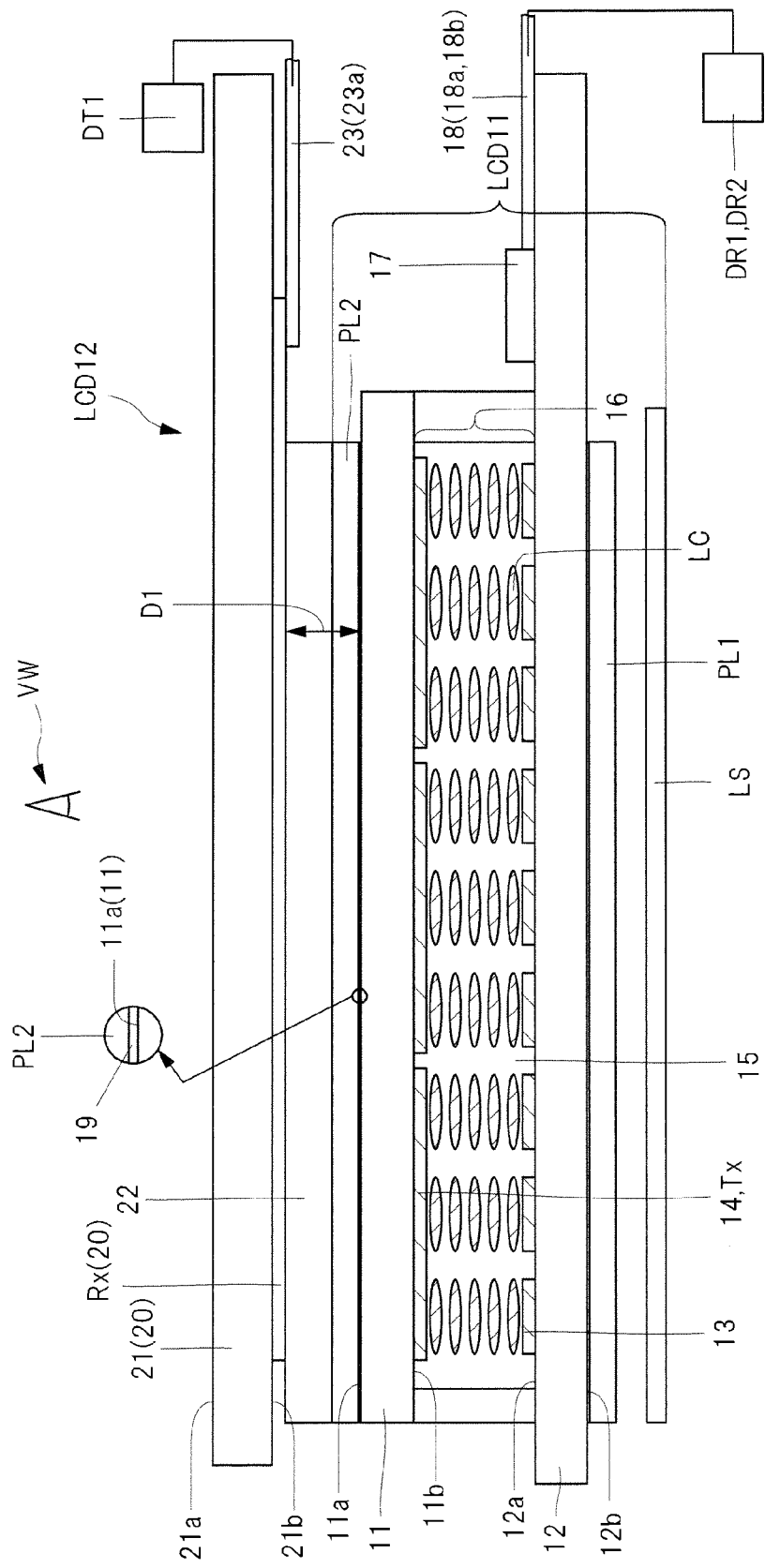
FIG. 21 is a cross-sectional diagram of a principal part illustrating a modification example of FIG. 6.

For example, in the above-described first and second embodiments, the examples of the display device have been explained by exemplifying the display device LCD1 of the horizontal electric field mode (more specifically, the FFS mode). However, a display device LCD11 of a vertical electric field mode as illustrated in FIG. 21 can be applied. FIG. 21 is a cross-sectional diagram of a principal part illustrating a modification example of FIG. 6. The display device LCD11 illustrated in FIG. 21 is different from the display device LCD1 illustrated in FIG. 6 in that the common electrode 14 is formed on the back surface 11b side of the substrate 11. That is, a mode of the display device LCD11 is so-called vertical electric field mode in which an electric field is applied in a thickness direction (or an out-of-plane direction) of the liquid crystal display device. A display device LCD12 with an input device illustrated in FIG. 21 is the same as the display device LCD2 with the input device illustrated in FIG. 6 also in that the common electrode 14 and the driving electrode Tx are commonly used, except in the above-described different points. As described above, even in the display device LCD11 of such the vertical electric field mode, the display device LCD12 with the input device can be obtained by applying the techniques explained in the above-described embodiments thereto.

Moreover, for example, the techniques explained in the above-described first and second embodiments can be applied to not only the liquid crystal display device but also a display device such as an organic EL (Electro-Luminescence) display.

Further, for example, in the above-described first and second embodiments, the modification example of the display device LCD2 with the input device illustrated in FIG. 6 has been explained first as the typical example upon the explanation of the modification example. However, combination of the modification examples already explained can be also applied.

Figure 22:
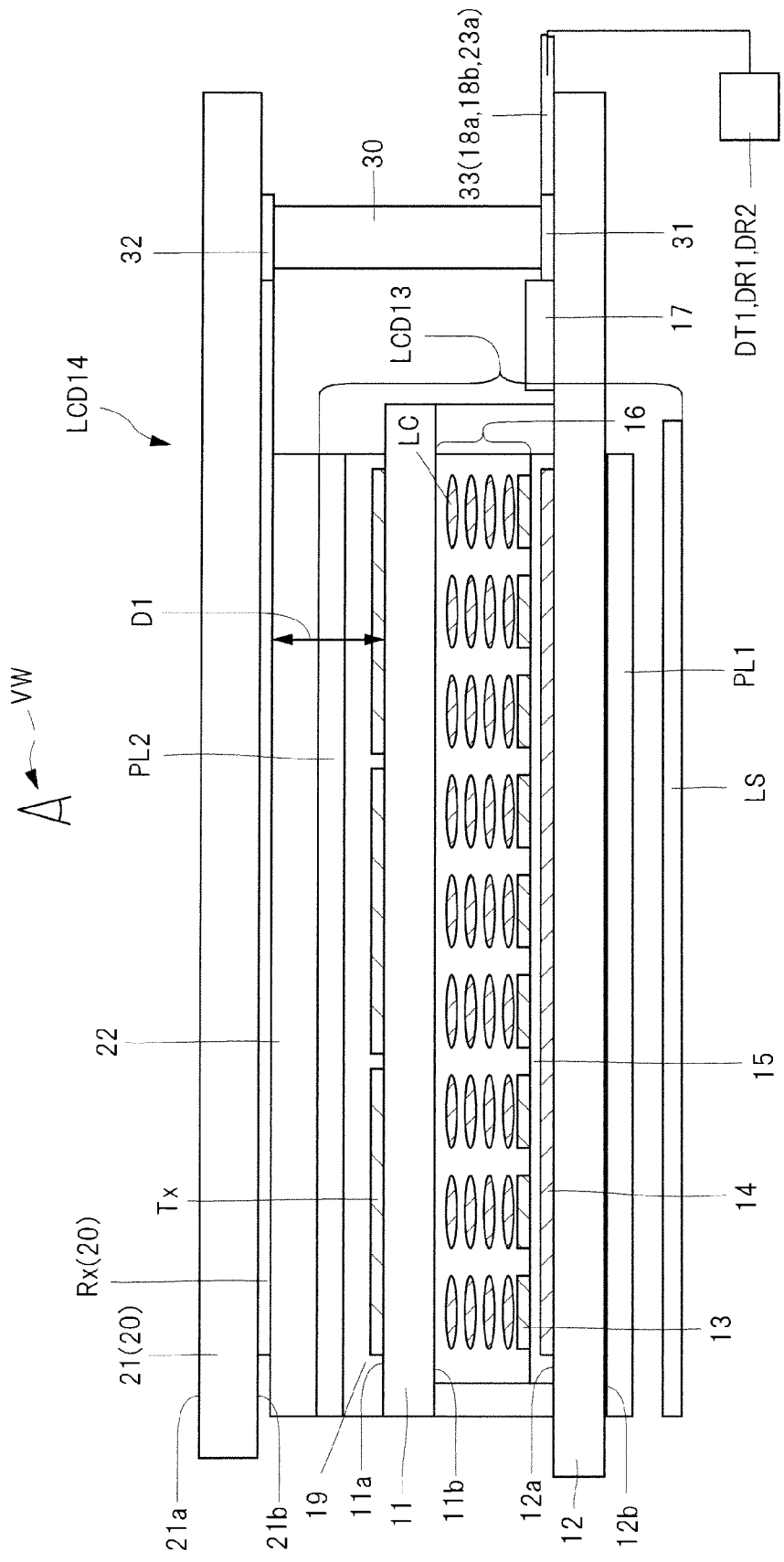
FIG. 22 is a cross-sectional diagram of a principal part illustrating another modification example of FIG. 16.

Further, in the above-described second embodiment, for example, the aspect of the integration of the wiring substrate 18 and the wiring substrate 23 has been explained as the modification example of the display device LCD2 with the input device illustrated in FIG. 6. However, if the circuit for the input device and the circuit for the display device are collectively formed on a facing surface of the substrates which face each other, the wiring substrates can be commonly used by applying the technique explained in the above-described second embodiment. For example, the invention can be also applied to a case that the driving electrode Tx for the input device is provided on the substrate 11 as a display device LCD14 with an input device illustrated in FIG. 22. FIG. 22 is a cross-sectional diagram of a principal part illustrating another modification example of FIG. 16.

The display device LCD14 with the input device illustrated in FIG. 22 is different from the display device LCD7 with the input device illustrated in FIG. 16 in that the driving electrode Tx for the input device is installed on the front surface 11a side of the substrate 11 of the display device LCD13. That is, in the display device LCD14 with the input device, the driving electrode Tx for the input device is not used also as the common electrode 14 for the display device but is provided independently therefrom. Note that, although illustration is omitted, the driving electrode Tx provided on the front surface 11a side of the substrate 11 is drawn once onto the substrate 21 side via a conductive member (or a conductive material) not illustrated. That is, the detection circuit DT1 for the input device and the driving circuit DR1 are collectively formed on the substrate 21 side. Therefore, the circuit configuration can be simplified.

However, as illustrated in FIG. 22, the substrate 11 is not interposed between the driving electrode Tx and the detection electrodes Rx, and therefore, it is required to increase the distance D1 larger than that of the display device LCD7 with the input device illustrated in FIG. 16. Therefore, from a viewpoint of the thinning, the display device LCD7 with the input device is more preferable. Moreover, as explained in the above-described first embodiment, also from a viewpoint of solving the problems caused by forming the transparent electrode on the front surface 11a of the substrate 11, the display device LCD7 with the input device is more preferable.

The present invention can be widely applied to a display device with an input device and an electronic apparatus in which the display device with the input device is embedded.

It should be understood that various changes and modifications to the presently preferred embodiments described herein will be apparent to those skilled in the art. Such changes and modifications can be made without departing from the spirit and scope of the present subject matter and without diminishing its intended advantages. It is therefore intended that such changes and modifications be covered by the appended claims.

The invention is claimed as follows:

1. A display device with an input device comprising the display device, a third substrate, a plurality of input position detection electrodes, a polarizing plate, a conductive resin layer, and a first adhesive layer
    the display device including
        a first substrate having a first surface,
        a second substrate having a second surface so as to face the first substrate,
        a plurality of pixel electrodes arranged between the first substrate and the second substrate,
        a common electrode arranged between the first substrate and the second substrate, and
        a display functional layer arranged between the first substrate and the second substrate so that a display image is formed by applying a display voltage between the plurality of pixel electrodes and the common electrode,
    the third substrate having a third surface so as to face the first surface of the display device and having a fourth surface so as to be positioned on an opposite side to the third surface,
    the plurality of input position detection electrodes being formed on the third surface of the third substrate so as to form an electrostatic capacity between them and the common electrode of the display device to detect an input position,
    the polarizing plate being arranged between the third surface of the third substrate and the first surface of the display device,
    the conductive resin layer containing a resin material and a plurality of conductive particles mixed with the resin material, being in contact with the plurality of input position detection electrodes so as to cover the plurality of input position detection electrodes, and being provided so as to be separated from the common electrode, and
    the first adhesive layer is provided between the polarizing plate and the conductive resin layer,
    wherein the plurality of input position detection electrodes, the conductive resin layer, the first adhesive layer, and the polarizing plate are arranged between the third surface of the third substrate and the first surface of the first substrate in an order from the third surface side,
    the second substrate being arranged on an opposite side to the first surface of the first substrate so as to be separated apart from the first substrate, and
    a sheet resistance value of the conductive resin layer is larger than a sheet resistance value of the plurality of input position detection electrodes.

2. The display device with the input device according to claim 1,
    wherein the polarizing plate is adhesively fixed to the first surface of the first substrate via a second adhesive layer, and
    the first adhesive layer has a thickness thicker than a thickness of the second adhesive layer.

3. The display device with the input device according to claim 1,
    wherein the conductive resin layer is adhesively fixed to the polarizing plate.

4. The display device with the input device according to claim 1,
    wherein a plurality of spacer members for defining a thickness of the first adhesive layer are mixed into the first adhesive layer.

5. The display device with the input device according to claim 4,
    wherein, when a diameter of each of the plurality of spacer members is 200 μm or smaller and when it is assumed that a refractive index of the first adhesive layer is R1 and that a refractive index of each of the spacer members is R2,
    a value of $(R1-R2)/(R1+R2)$ is within ±3.0%.

6. The display device with the input device according to claim 1,
    wherein the third substrate is a glass plate.

7. The display device with the input device according to claim 1,
    wherein a first connection terminal to be electrically connected to the plurality of input position detection electrodes is provided on the second surface side of the second substrate,
    a second connection terminal is provided on the third surface side of the third substrate, and
    the first connection terminal and the second connection terminal are electrically connected to each other via a conductive member arranged between the first connection terminal and the second connection terminal.

8. The display device with the input device according to claim 7,
    wherein the first connection terminal is provided on a peripheral edge of the second substrate, and the second connection terminal is provided on a peripheral edge of the third substrate so as to face the first connection terminal.

9. The display device with the input device according to claim 7,
    wherein the conductive member is connected to a wiring substrate including a first wire electrically connected to the plurality of pixel electrodes, a second wire electrically connected to the common electrode, and a third wire electrically connected to the plurality of input position detection electrodes, and
    either one of the first connection terminal and the second connection terminal is formed on the wiring substrate.

10. The display device with the input device according to claim 7,
    wherein the conductive member is a wiring substrate including a first wire electrically connected to the plurality of pixel electrodes, a second wire electrically connected to the common electrode, and a third wire electrically connected to the plurality of input position detection electrodes.

11. The display device with the input device according to claim 1,
wherein a refractive index of the conductive resin layer has a value between a refractive index of the plurality of input position detection electrodes and a refractive index of the first adhesive layer or the polarizing plate.

12. A method of manufacturing a display device with an input device comprising the steps of
(a) assembling a display device including a first substrate having a first surface, a second substrate having a second surface so as to face the first substrate and being arranged on an opposite side to the first surface of the first substrate so as to be separated apart from the first substrate, a plurality of pixel electrodes arranged between the first substrate and the second substrate, a common electrode arranged between the first substrate and the second substrate, a display functional layer arranged between the first substrate and the second substrate so that a display image is formed by applying a display voltage between the plurality of pixel electrodes and the common electrode, and a polarizing plate being arranged on the first surface of the first substrate,
(b) forming a plurality of input position detection electrodes on a third surface of a third substrate having the third surface and a fourth surface positioned on an opposite side to the third surface, the plurality of input position detection electrodes forming an electrostatic capacity between them and the common electrode of the display device to detect an input position,
(c) subsequent to the step of (b), forming a conductive resin layer in contact with the plurality of detection electrodes so as to cover the plurality of input position detection electrodes by applying a conductive resin material obtained by mixing conductive particles with a resin material, on the third surface of the third substrate, and the conductive resin layer being separated from the common electrode, and
(d) subsequent to the step of (a) and step of (c), adhesively fixing the conductive resin layer and the polarizing plate via a first adhesive layer by arranging the third surface of the third substrate on the polarizing plate so as to face each other and so that the plurality of input position detection electrodes and the first surface of the display device are separated apart from each other,
wherein a sheet resistance value of the conductive resin layer is larger than a sheet resistance value of the plurality of input position detection electrodes.

13. An electric apparatus provided with a display device with an input device comprising the display device, a third substrate, a plurality of input position detection electrodes, a polarizing plate, a conductive resin layer, and a first adhesive layer,
the display device including
a first substrate having a first surface,
a second substrate having a second surface so as to face the first substrate,
a plurality of pixel electrodes arranged between the first substrate and the second substrate,
a common electrode arranged between the first substrate and the second substrate, and
a display functional layer arranged between the first substrate and the second substrate so that a display image is formed by applying a display voltage between the plurality of pixel electrodes and the common electrode,
the third substrate having a third surface so as to face the first surface of the display device and having a fourth surface so as to be positioned on an opposite side to the third surface,
the plurality of input position detection electrodes being formed on the third surface of the third substrate so as to form an electrostatic capacity between them and the common electrode of the display device to detect an input position,
the polarizing plate being arranged between the third surface of the third substrate and the first surface of the display device,
the conductive resin layer containing a resin material and a plurality of conductive particles mixed with the resin material and being in contact with the plurality of input position detection electrodes so as to cover the plurality of input position detection electrodes, and the conductive resin layer being provided so as to be separated from the common electrode, and
the first adhesive layer provided between the polarizing plate and the conductive resin layer,
wherein the plurality of input position detection electrodes, the conductive resin layer, the first adhesive layer, and the polarizing plate are arranged between the third surface of the third substrate and the first surface of the first substrate in an order from the third surface side,
the second substrate being arranged on an opposite side to the first surface of the first substrate so as to be separated apart from the first substrate, and
a sheet resistance value of the conductive resin layer is larger than a sheet resistance value of the plurality of input position detection electrodes.

* * * * *